(12) United States Patent
Osawa

(10) Patent No.: US 10,649,196 B2
(45) Date of Patent: May 12, 2020

(54) STRUCTURED ILLUMINATION MICROSCOPE, OBSERVATION METHOD, AND CONTROL PROGRAM

(71) Applicant: NIKON CORPORATION, Tokyo (JP)

(72) Inventor: Hisao Osawa, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 22 days.

(21) Appl. No.: 15/666,842

(22) Filed: Aug. 2, 2017

(65) Prior Publication Data

US 2017/0329122 A1 Nov. 16, 2017

Related U.S. Application Data

(63) Continuation of application No. PCT/JP2015/053211, filed on Feb. 5, 2015.

(51) Int. Cl.
   *G02B 21/36* (2006.01)
   *G02B 21/06* (2006.01)
   (Continued)

(52) U.S. Cl.
   CPC ....... *G02B 21/365* (2013.01); *G01N 21/6428* (2013.01); *G01N 21/6458* (2013.01);
   (Continued)

(58) Field of Classification Search
   CPC ... G01N 2021/6478; G01N 2021/0697; G01N 2021/10; G01N 2021/105;
   (Continued)

(56) References Cited

U.S. PATENT DOCUMENTS

| | | | | |
|---|---|---|---|---|
| RE38,307 E | * | 11/2003 | Gustafsson | ............ G02B 21/22 359/368 |
| 6,711,283 B1 | * | 3/2004 | Soenksen | ............. G02B 21/002 382/133 |

(Continued)

FOREIGN PATENT DOCUMENTS

| | | |
|---|---|---|
| JP | 2010-540995 A | 12/2010 |
| JP | 2011-511966 A | 4/2011 |

(Continued)

OTHER PUBLICATIONS

Apr. 28, 2015 International Search Report issued in Intenational Patent Application No. PCT/JP2015/053211.

(Continued)

*Primary Examiner* — David P Porta
*Assistant Examiner* — Djura Malevic
(74) *Attorney, Agent, or Firm* — Oliff PLC

(57) ABSTRACT

A structured illumination microscope includes: a first illumination optical system configured to irradiate, from a first direction, a sample with activating light for activating a fluorescent substance included in the sample; a second illumination optical system configured to irradiate, from a second direction that is different from the first direction, the sample with interference fringes of exciting light for exciting the fluorescent substance; a control unit configured to control a direction and a phase of the interference fringes; an imaging optical system configured to form an image of the sample irradiated with the interference fringes; an imaging element configured to take the image formed by the imaging optical system to generate a first image; and a demodulation unit configured to generate a second image by using a plurality of the first images generated by the imaging element.

21 Claims, 21 Drawing Sheets

US 10,649,196 B2

Page 2

(51) Int. Cl.
*G01N 21/64* (2006.01)
*G02B 21/12* (2006.01)
*G02B 21/10* (2006.01)
*G02B 21/16* (2006.01)
*G02B 27/58* (2006.01)

(52) U.S. Cl.
CPC .............. *G02B 21/06* (2013.01); *G02B 21/10* (2013.01); *G02B 21/125* (2013.01); *G02B 21/16* (2013.01); *G02B 21/367* (2013.01); *G02B 27/58* (2013.01); *G01N 21/6445* (2013.01); *G01N 2021/6439* (2013.01); *G01N 2021/6478* (2013.01); *G01N 2201/062* (2013.01); *G01N 2201/0612* (2013.01); *G01N 2201/0635* (2013.01)

(58) Field of Classification Search
CPC ...... G01N 2021/06113; G02B 21/0032; G02B 21/0048; G02B 21/6458; G02B 21/0072
See application file for complete search history.

(56) References Cited

U.S. PATENT DOCUMENTS

| | | | | |
|---|---|---|---|---|
| 6,903,347 B2 * | 6/2005 | Baer | ................. | G02B 21/0056 250/458.1 |
| 7,297,961 B2 * | 11/2007 | Kang | ................. | G02B 21/16 250/458.1 |
| 7,417,227 B2 * | 8/2008 | Matsumoto | ........... | H01J 37/244 250/306 |
| 7,554,725 B2 * | 6/2009 | Stelzer | ................. | G02B 21/06 359/385 |
| 7,772,569 B2 * | 8/2010 | Bewersdorf | ........... | G02B 21/16 250/458.1 |
| 7,787,179 B2 * | 8/2010 | Lippert | ................. | G02B 21/06 359/385 |
| 7,801,352 B2 * | 9/2010 | Uchiyama | ............ | G02B 21/367 382/133 |
| 7,894,136 B2 * | 2/2011 | Betzig | ................. | G01N 21/6445 359/370 |
| 7,916,304 B2 * | 3/2011 | Hess | ........................ | G01B 9/04 356/496 |
| 7,969,652 B2 * | 6/2011 | Nakayama | ............ | G02B 21/16 359/370 |
| 8,081,378 B2 * | 12/2011 | Osawa | ................ | G02B 21/0032 359/368 |
| 8,115,806 B2 * | 2/2012 | Osawa | ................. | G02B 21/06 348/61 |
| 8,351,120 B2 * | 1/2013 | Deng | ................. | G02B 27/0012 348/241 |
| 8,441,633 B2 * | 5/2013 | Truong | .............. | G01N 21/6408 356/301 |
| 8,792,162 B2 * | 7/2014 | Lippert | .............. | G02B 21/0032 359/385 |
| 8,809,810 B2 * | 8/2014 | Liu | ................... | G01N 21/6452 250/483.1 |
| 8,836,948 B2 * | 9/2014 | Liu | ........................ | G01B 9/04 356/445 |
| 8,970,950 B2 * | 3/2015 | Stelzer | ................. | G02B 21/06 359/385 |
| 8,978,984 B2 * | 3/2015 | Hennick | ............ | G06K 7/10732 235/462.41 |
| 9,057,879 B2 * | 6/2015 | Knebel | ................ | G02B 21/002 |
| 9,110,301 B2 * | 8/2015 | Lippert | ................ | G02B 21/002 |
| 9,134,521 B2 * | 9/2015 | Huisken | .............. | G02B 21/0048 |
| 9,217,665 B2 * | 12/2015 | Santori | ................ | G01J 1/0407 |
| 9,305,956 B2 * | 4/2016 | Pitts | .................. | H01L 27/14627 |
| 9,307,169 B2 * | 4/2016 | Kodama | .............. | G01J 3/0208 |
| 9,500,849 B2 * | 11/2016 | Lippert | ................ | G02B 21/002 |
| 9,645,378 B2 * | 5/2017 | Hilbert | ................ | G02B 21/002 |
| 9,658,443 B2 * | 5/2017 | Broxton | .............. | G02B 21/367 |
| 9,678,323 B2 * | 6/2017 | Orth | ..................... | G02B 21/16 |
| 9,697,605 B2 * | 7/2017 | Lippert | ................ | G02B 21/002 |
| 9,804,378 B2 * | 10/2017 | Singer | ................ | G02B 27/0025 |
| 9,810,896 B2 * | 11/2017 | Nishiwaki | ............ | G02B 21/367 |
| 9,829,691 B2 * | 11/2017 | Otte | ..................... | G02B 21/0032 |
| 10,018,819 B2 * | 7/2018 | Iguchi | ................ | G02B 21/06 |
| 10,042,148 B2 * | 8/2018 | Iguchi | ................ | G02B 21/006 |
| 10,048,482 B2 * | 8/2018 | Pretorius | ............ | G02B 27/0025 |
| 10,067,328 B2 * | 9/2018 | Ouchi | ................ | G02B 21/0092 |
| 10,095,018 B2 * | 10/2018 | Ouchi | ................ | G02B 21/0092 |
| 10,114,207 B2 * | 10/2018 | Ishiwata | .............. | G02B 21/361 |
| 2003/0218746 A1 * | 11/2003 | Sampas | ............. | G01N 21/6428 356/318 |
| 2005/0089208 A1 * | 4/2005 | Dong | ................. | G02B 21/241 382/133 |
| 2005/0092934 A1 * | 5/2005 | Kang | ................... | G02B 21/16 250/458.1 |
| 2006/0012872 A1 * | 1/2006 | Hayashi | ................ | G01N 21/21 359/386 |
| 2006/0033987 A1 * | 2/2006 | Stelzer | ................... | G02B 21/06 359/385 |
| 2006/0038144 A1 * | 2/2006 | Maddison | ............ | G02B 21/367 250/559.05 |
| 2006/0088844 A1 * | 4/2006 | Xu | ........................ | C12Q 1/6825 435/6.12 |
| 2006/0197034 A1 * | 9/2006 | Shirai | ................. | G01N 21/6428 250/458.1 |
| 2007/0035855 A1 * | 2/2007 | Dickensheets | ....... | A61B 5/0068 359/819 |
| 2007/0058246 A1 * | 3/2007 | Westphal | ............. | G02B 21/082 359/368 |
| 2007/0154938 A1 * | 7/2007 | Oshida | ............... | G01N 21/6428 435/6.11 |
| 2007/0206097 A1 * | 9/2007 | Uchiyama | ............ | G02B 21/367 348/207.99 |
| 2007/0206276 A1 * | 9/2007 | Gugel | ................ | G02B 21/0076 359/385 |
| 2008/0185533 A1 * | 8/2008 | Kimura | ................ | G02B 21/002 250/458.1 |
| 2009/0237765 A1 * | 9/2009 | Lippert | .................. | G02B 21/06 359/213.1 |
| 2009/0296205 A1 * | 12/2009 | Ouchi | ................... | G02B 21/16 359/370 |
| 2010/0111768 A1 * | 5/2010 | Banerjee | .............. | C12Q 1/6869 422/82.08 |
| 2010/0148092 A1 * | 6/2010 | Zheng | .................. | G01N 21/6452 250/459.1 |
| 2010/0193673 A1 | 8/2010 | Power et al. | | |
| 2011/0036996 A1 * | 2/2011 | Wolleschensky | .. | G01N 21/6458 250/459.1 |
| 2011/0115895 A1 * | 5/2011 | Huisken | ............. | G02B 21/0048 348/79 |
| 2012/0026311 A1 * | 2/2012 | Ouchi | ................... | G02B 21/06 348/79 |
| 2012/0098949 A1 * | 4/2012 | Knebel | ................ | G02B 21/002 348/79 |
| 2012/0200693 A1 * | 8/2012 | Lippert | ................ | G02B 21/002 348/79 |
| 2013/0130937 A1 * | 5/2013 | Sun | ................... | G01N 21/6452 506/16 |
| 2013/0228705 A1 * | 9/2013 | Nishikawa | ......... | G01N 15/1463 250/459.1 |
| 2013/0229665 A1 * | 9/2013 | Nomura | ............... | G02B 27/425 356/601 |
| 2014/0104407 A1 * | 4/2014 | Ouchi | ................. | G02B 21/0092 348/79 |
| 2015/0153560 A1 * | 6/2015 | Lippert | ................ | G02B 21/367 348/79 |
| 2015/0168702 A1 * | 6/2015 | Harris | ................... | G02B 21/08 850/30 |
| 2015/0168706 A1 * | 6/2015 | Schweinitzer | ....... | G02B 21/367 348/80 |
| 2015/0177506 A1 * | 6/2015 | Nishiwaki | ............ | G02B 21/367 348/46 |
| 2015/0185463 A1 * | 7/2015 | Ohki | ................... | G02B 21/06 348/79 |
| 2015/0253560 A1 * | 9/2015 | Otte | ................... | G02B 21/0032 359/385 |

(56) References Cited

U.S. PATENT DOCUMENTS

| | | | | |
|---|---|---|---|---|
| 2015/0355449 | A1* | 12/2015 | Orth | G02B 21/16 348/79 |
| 2016/0070091 | A1* | 3/2016 | Hufnagel | G02B 21/0076 359/385 |
| 2016/0124201 | A1* | 5/2016 | Kikuchi | G02B 21/16 359/385 |
| 2016/0124203 | A1* | 5/2016 | Ryu | G02B 21/06 348/79 |
| 2016/0131885 | A1* | 5/2016 | Nakayama | G01N 21/6428 250/458.1 |
| 2016/0139394 | A1* | 5/2016 | Taniguchi | G02B 21/24 359/385 |
| 2016/0154236 | A1* | 6/2016 | Siebenmorgen | G02B 21/0032 359/385 |
| 2016/0170195 | A1* | 6/2016 | Siebenmorgen | G02B 21/0032 359/385 |
| 2016/0291304 | A1* | 10/2016 | Singer | G02B 27/0025 |
| 2016/0305883 | A1* | 10/2016 | Betzig | G02B 21/16 |
| 2016/0306154 | A1* | 10/2016 | Iguchi | G02B 21/06 |
| 2016/0320600 | A1* | 11/2016 | Dake | G02B 21/008 |
| 2016/0334613 | A1* | 11/2016 | Ishiwata | G02B 21/361 |
| 2017/0139193 | A1* | 5/2017 | Iguchi | G02B 21/006 |
| 2018/0088308 | A1* | 3/2018 | Liu | G02B 21/367 |

FOREIGN PATENT DOCUMENTS

| | | |
|---|---|---|
| WO | 2013/080542 A1 | 6/2013 |
| WO | 2014/020911 A1 | 2/2014 |

OTHER PUBLICATIONS

Aug. 8, 2017 International Preliminary Report on Patentability issued in International Patent Application No. PCT/JP2015/053211.

Aug. 21, 2018 Office Action issued in Japanese Patent Application No. 2016-573005.

Jun. 4, 2019 Office Action issued in Japanese Patent Application No. 2016-573005.

* cited by examiner

STRUCTURED ILLUMINATION MICROSCOPE, OBSERVATION METHOD, AND CONTROL PROGRAM

CROSS REFERENCE TO RELATED APPLICATION

This is a Continuation of PCT Application No. PCT/JP2015/053211, filed on Feb. 5, 2015. The contents of the above-mentioned application are incorporated herein by reference.

FIELD OF THE INVENTION

The present invention relates to a structured illumination microscope, an observation method, and a media.

BACKGROUND

Types of microscope devices include a super-resolution microscope, which enables observation with a resolution higher than the limit of resolution of optical systems. One form of the super-resolution microscope is known as a structured illumination microscope (SIM), which is configured to illuminate a sample with structured illumination to acquire modulated images, and demodulate the modulated images to generate a super-resolution image of the sample (see, for example, Patent Literature 1). This method involves branching a beam that has been emitted from a light source into a plurality of beams with a diffraction grating or the like, and illuminating a sample with interference fringes formed by causing the beams to interfere with each other in the vicinity of the sample, thereby acquiring modulated images of the sample.

CITATION LIST

Patent Literature

[Patent Literature 1] U.S. Reissue Pat. No. 38307

A modulated image taken by a structured illumination microscope includes light (signals) from an area within the depth of focus and light from an area outside the depth of focus. Image components obtained by the light from the area outside the depth of focus have low contrast of structured illumination. As the thickness of a sample becomes larger than the depth of focus of an imaging optical system, the contrast of structured illumination in a taken image decreases. Depending on the device characteristics of an imaging element, for example, it is difficult to obtain the level of signals used for demodulation. The present invention has been made in view of the above-mentioned circumstances, and it is an object thereof to provide a structured illumination microscope, an observation method, and a control program that are capable of generating a super-resolution image of a sample having a thickness larger than the depth of focus of an imaging optical system.

SUMMARY

According to a first aspect of the present invention, there is provided a structured illumination microscope including: a first illumination optical system configured to irradiate, from a first direction, a sample with activating light for activating a fluorescent substance included in the sample; a second illumination optical system configured to irradiate, from a second direction that is different from the first direction, the sample with exciting light for exciting the fluorescent substance and illuminate the sample with interference fringes of the exciting light; a control unit configured to control a direction and a phase of the interference fringes; an imaging optical system configured to form an image of the sample irradiated with the interference fringes; an imaging element configured to take the image formed by the imaging optical system to generate a first image; and a demodulation unit configured to generate a second image by using a plurality of the first images generated by the imaging element.

According to a second aspect of the present invention, there is provided an observation method including: irradiating, from a first direction, a sample with activating light for activating a fluorescent substance included in the sample; irradiating, from a second direction that is different from the first direction, the sample with interference fringes of exciting light for exciting the fluorescent substance; controlling a direction and a phase of the interference fringes; forming an image of the sample irradiated with the interference fringes; taking the image to generate a first image; and generating a second image by using a plurality of the first images generated by the taking.

According to a third aspect of the present invention, there is provided a non-transitory tangible media storing therein a control program for causing a computer to execute: irradiating, from a first direction, a sample with activating light for activating a fluorescent substance included in the sample; irradiating, from a second direction that is different from the first direction, the sample with interference fringes of exciting light for exciting the fluorescent substance; controlling a direction and a phase of the interference fringes; forming an image of the sample irradiated with the interference fringes; taking the image to generate a first image; and generating a second image by using a plurality of the first images generated by the taking.

With the present invention, a structured illumination microscope, an observation method, and a control program can be provided that are capable of generating a super-resolution image of a sample having a thickness larger than the depth of focus of an imaging optical system.

DETAILED DESCRIPTION OF EMBODIMENTS

First Embodiment

Figure 1:
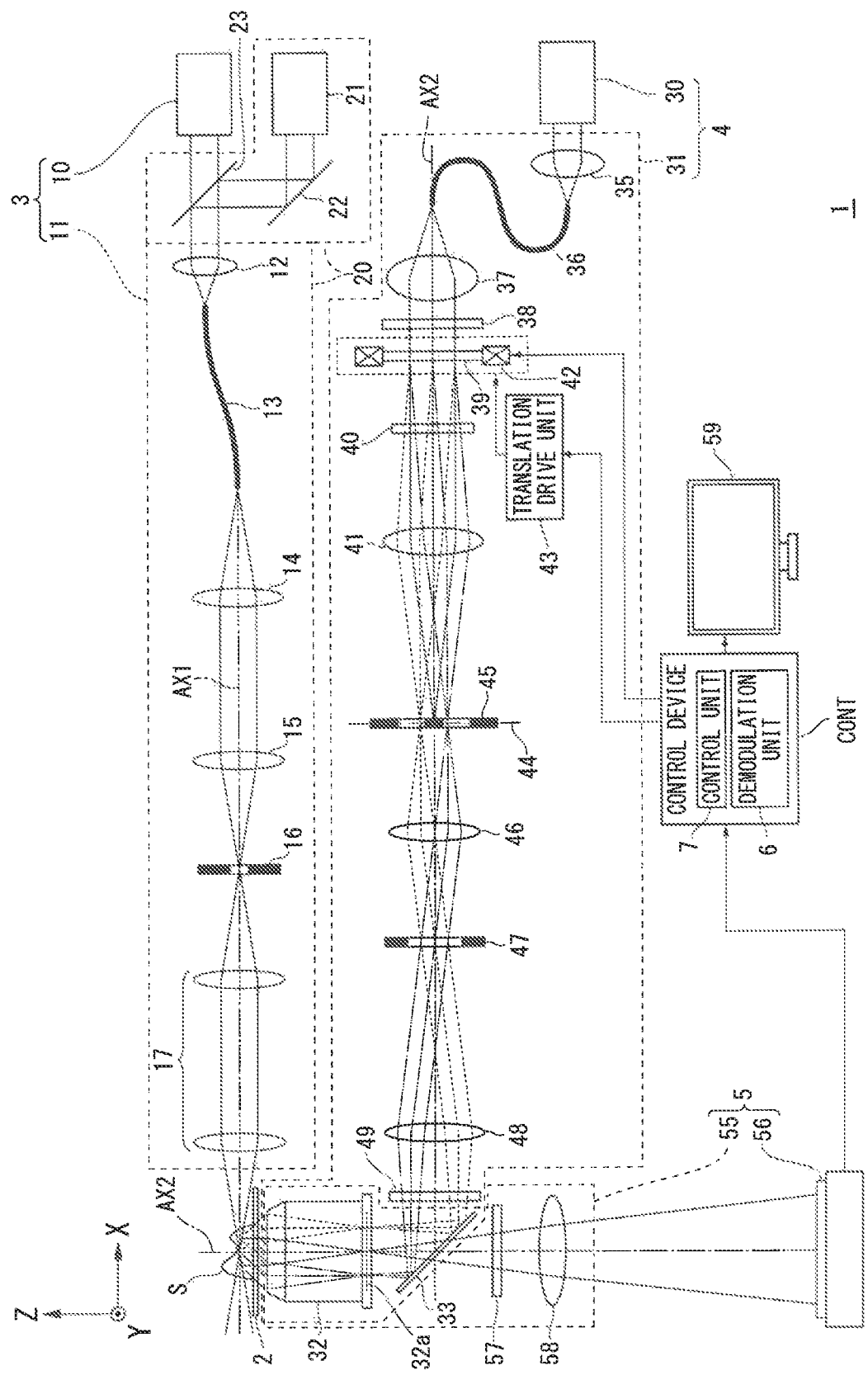
FIG. 1 is a diagram illustrating a structured microscope according to a first embodiment.

FIG. 1 is a diagram illustrating a structured illumination microscope 1 (observation system) according to a first embodiment. The structured illumination microscope 1 is used to observe a sample S dyed with a fluorescent dye (fluorescent substance). Examples of the sample S include a fluorescent cell (cell dyed with fluorescent dye) disposed on the surface of a flat glass plate and a fluorescent biological cell (moving cell dyed with fluorescent dye) present in a petri dish.

A fluorescent dye included in the sample S is activated when receiving activating light, and emits fluorescence when receiving exciting light in the activated state. When the fluorescent dye in the activated state receives inactivating light, the fluorescent dye emits fluorescence and is inactivated. The wavelength of the inactivating light may be, for example, the same as the wavelength of the exciting light. Examples of the fluorescent dyes include dye pairs obtained by coupling two kinds of cyanine dye (such as dye pair of Cy3-Cy5, dye pair of Cy2-Cy5, and dye pair of Cy3-Alexa647). In the dye pair of Cy3-Cy5, for example, Cy3 is a site to activate Cy5, and when irradiated with green light of 532 nm, Cy5 is activated. When irradiated with red light of 640 nm corresponding to an absorption wavelength of Cy5, Cy5 emits fluorescence and is inactivated.

The structured illumination microscope 1 has a 2D-SIM mode for generating a two-dimensional super-resolution image of a part of the sample S in the thickness direction. The structured illumination microscope 1 includes a stage 2, an activating illumination unit 3, an exciting illumination unit 4, an imaging unit 5, a demodulation unit 6, and a control unit 7. The structured illumination microscope 1 schematically operates as follows. The stage 2 holds the sample S. The activating illumination unit 3 irradiates the sample S with sheet-shaped activating light. The activating illumination unit 3 selectively activates a part of the sample S in the thickness direction, and maintains other parts of the sample S in an inactivated state. The exciting illumination unit 4 forms interference fringes with exciting light. The exciting illumination unit 4 illuminates an activated part of the sample S with the interference fringes from a direction perpendicular to the light irradiation direction of the activating illumination unit 3. The imaging unit 5 takes modulated images of the sample S modulated by the interference fringes. The demodulation unit 6 demodulates the modulated images taken by the imaging unit 5 to generate an image (super-resolution image) of the sample S. The control unit 7 controls each unit in the structured illumination microscope 1 to execute various kinds of processing.

Next, each unit in the structured illumination microscope 1 is described. In the following description, a first direction (light irradiation direction) in which the activating illumination unit 3 irradiates the sample with light is referred to as "X direction". A second direction (light irradiation direction) in which the exciting illumination unit 4 irradiates the sample S with light is referred to as "Z direction". A third direction perpendicular to each of the X direction and the Z direction is referred to as "Y direction". The X direction and the Y direction are set to, for example, the horizontal direction, and the Z direction is set to, for example, the vertical direction. Each direction is affixed with + or − to indicate the direction and orientation as appropriate.

The stage 2 can place the sample S on its top surface. The stage 2 can move the top surface in the Z direction, with the sample S placed on the top surface. The stage 2 is controlled by the control unit 7 and the position of the top surface in the Z direction can be adjusted. The control unit 7 controls the stage 2 to control the position (height) of the sample S in the Z direction that is disposed on the top surface. The stage 2 may be configured to move the sample S in at least one of the X direction or the Y direction. The stage 2 is not necessarily required to move the sample S in the Z direction.

The activating illumination unit 3 includes a light source unit 10 and a first illumination optical system 11. The light source unit 10 is controlled by the control unit 7 to emit activating light. The activating light includes light in a first wavelength band for activating a predetermined fluorescent substance (fluorescent dye). The light source unit 10 includes, for example, a laser diode (LD), but may include a light emitting diode (LED). The light source unit 10 may emit either of coherent light or incoherent light as the activating light. The light source unit 10 may emit linearly polarized light, elliptically polarized light, or non-polarized light as the activating light. The structured illumination microscope 1 is not necessarily required to include the light source unit 10. For example, the light source unit 10 may be replaceably (removably) provided to the structured illumination microscope 1, that is, may be a device outside the structured illumination microscope 1.

The first illumination optical system 11 guides the activating light from the light source unit 10 to the sample S. In the first embodiment, an optical axis AX1 of the first illumination optical system 11 is set such that the light irradiation direction of the activating illumination unit 3 is the X direction. The first illumination optical system 11 includes, on the light exit side of the light source unit 10, a condensing lens 12, an optical fiber 13, a collimator lens 14, a cylindrical lens 15, a slit 16, and a lens group 17.

The condensing lens 12 condenses the activating light from the light source unit 10 so as to fall within an incident end surface of the optical fiber 13. The optical fiber 13 is a light guide member configured to guide the light that has entered the incident end surface to an exit end surface thereof. The collimator lens 14 collimates the activating light that has exited from the exit end surface of the optical fiber 13. The cylindrical lens 15 is an optical member in which refractive power (power) in the XZ plane is stronger than refractive power in the XY plane. The collimator lens 14 and the cylindrical lens 15 form the cross-sectional shape of the activating light in the sample S (illumination region of activating illumination unit 3) into a shape whose lateral direction is the Z direction rather than the Y direction.

The slit 16 is a field stop (stop member), and is disposed at a position optically conjugate with the illumination region of the activating illumination unit 3. The slit 16 has an opening portion through which at least a part of the activating light from the light source unit 10 passes. The shape of the opening portion is set such that the dimension in the Z direction is shorter than the dimension in the Y direction, and is, for example, a rectangle having short sides parallel to the Z direction. The aperture ratio of the slit 16 may be either of a fixed value or a variable value. For example, at least one of the shape or dimensions of the opening portion in the slit 16 may be variable. For example, the inner dimension of the opening portion in the slit 16 may be variable in at least one of the Y direction or the Z direction.

The lens group 17 is, for example, a projection optical system. The lens group 17 projects an image of the opening portion in the slit 16 to the illumination region of the activating illumination unit 3. The activating light that has passed through the opening portion in the slit 16 irradiates the sample S through the lens group 17. By setting the numerical aperture (NA) of the first illumination optical system 11 on the light exit side (for example, lens group 17) to be small, a divergence angle of the activating light in exiting from the first illumination optical system 11 can be decreased. As a result, a change in thickness (width of optical path in Z direction) of the activating light in the sample S can be reduced.

In this manner, the activating illumination unit 3 can irradiate a part of the sample S in the Z direction with the activating light to selectively activate a sheet-shaped part of the sample S. In the following description, the activated sheet-shaped part is referred to as "activated layer".

In the first embodiment, the structured illumination microscope 1 includes an inactivating illumination unit 20. The inactivating illumination unit 20 irradiates the sample S with inactivating light for inactivating a fluorescent dye activated by the activating light. The inactivating illumination unit 20 includes a light source unit 21, a mirror 22, a dichroic mirror 23, and a first illumination optical system 11. The light source unit 21 emits inactivating light including light in a second wavelength band for shifting the state of a predetermined fluorescent dye from an activated state to an inactive state.

The inactivating light that has been emitted from the light source unit 21 is reflected by the mirror 22 to enter the dichroic mirror 23. The mirror 22 and the dichroic mirror 23 are light guide members configured to guide the inactivating light that has been emitted from the light source unit 21 to the first illumination optical system 11. The dichroic mirror 23 is disposed in an optical path between the light source unit 10 and the condensing lens 12. The dichroic mirror 23 has a wavelength selective film inside. The wavelength selective film has characteristics that transmit the activating light from the light source unit 10 and reflect the inactivating light from the light source unit 21. The inactivating light that has entered the dichroic mirror 23 is reflected by the wavelength selective film, passes through substantially the same optical path as that of the activating light from the light source unit 10, and enters the first illumination optical system 11. The inactivating light that has entered the first illumination optical system 11 is formed into a sheet shape to be emitted to the sample S similarly to the activating light. The structured illumination microscope 1 is not necessarily required to include the light source unit 21. For example, the light source unit 21 may be replaceably (removably) provided to the structured illumination microscope 1, that is, may be a device outside the structured illumination microscope 1.

In the first embodiment, the range where the inactivating illumination unit 20 irradiates the sample with the inactivating light (hereinafter referred to as "illumination region of inactivating illumination unit 20") substantially matches with the range where the activating illumination unit 3 irradiates the sample with the activating light (hereinafter referred to as "illumination region of activating illumination unit 3"). The illumination region of the inactivating illumination unit 20 may be set to be wider than the illumination region of the activating illumination unit 3. For example, when the opening portion in the slit 16 in the first illumination optical system 11 is variable, the opening width (for example, inner diameter in Z direction) of the slit 16 when the inactivating light passes through the first illumination optical system 11 may be set to be larger than that when the activating light passes through the first illumination optical system 11. In this case, an inactivated part can be prevented from being left in an activated part of the sample S. The control unit 7 may control a drive unit (not shown) configured to drive the opening portion in the slit 16 to control the aperture ratio of the slit 16.

The exciting illumination unit 4 illuminates the sample with interference fringes formed by exciting light. The exciting illumination unit 4 includes a light source unit 30 and a second illumination optical system 31. The light source unit 30 is controlled by the control unit 7 to emit exciting light. The exciting light includes light in a wavelength band for exciting a predetermined fluorescent dye, and includes, for example, light in the same wavelength as the inactivating light. The light source unit 30 may include, for example, a laser diode (LD) and emit coherent light as exciting light, or may include a light emitting diode (LED) and emit incoherent light as exciting light. In the first embodiment, the light source unit 30 emits linearly polarized light as activating light. The structured illumination microscope 1 is not necessarily required to include the light source unit 30. For example, the light source unit 30 may be replaceably (removably) provided to the structured illumination microscope 1, that is, may be a device outside the structured illumination microscope 1.

The second illumination optical system 31 irradiates the sample S with exciting light through an objective lens 32 to perform epi-illumination of the sample S. An optical axis of the objective lens 32 (optical axis of second illumination optical system 31 on light exit side) is set to the Z direction. An optical axis AX2 of the second illumination optical system 31 is bent by the dichroic mirror 33 on the light source unit 30 side with respect to the objective lens 32. The optical axis AX2 of the second illumination optical system 31 is freely set in an optical path on the light source unit 30 side with respect to the dichroic mirror 33, and is set to, for example, a direction parallel to the XY plane.

The second illumination optical system 31 includes, on the light exit side of the light source unit 30, a condensing lens 35, an optical fiber 36, and a collector lens 37. The condensing lens 35 condenses the exciting light from the light source unit 30 so as to fall within an incident end surface of the optical fiber 36. The optical fiber 36 is a light guide member configured to guide the light that has entered the incident end surface to an exit end surface thereof. For example, the optical fiber 36 is a polarization maintaining single-mode fiber that guides the exciting light with almost no change of the polarized state of the exciting light. The exciting light that exits from the optical fiber 36 is, for example, linearly polarized light in the Z direction. The collector lens 37 collimates the exciting light that has exited from the exit end surface of the optical fiber 36.

The second illumination optical system 31 includes, on the light exit side of the collector lens 37, a polarizing plate 38, a diffraction grating 39, a ½ wavelength plate 40, and a lens 41. In the first embodiment, the optical axis AX2 of the second illumination optical system 31 is set to be parallel to the X direction in an optical path from the collector lens 37 to the dichroic mirror 33. The polarizing plate 38 transmits linearly polarized light parallel to its transmission axis, and blocks linearly polarized light perpendicular to the transmission axis. For example, the transmission axis of the polarizing plate 38 is set to be parallel to the Z direction, and the polarizing plate 38 blocks components of exciting light with disturbed polarized states and stray light from the light source unit 30 side with respect to the polarizing plate 38.

The diffraction grating 39 is a branch unit configured to branch the exciting light from the light source unit 30. The diffraction grating 39 diffracts the exciting light to be branched into beams. In the first embodiment, the second illumination optical system 31 generates interference fringes in a sample through two-beam interference of a +1st order diffracted light beam and a −1st order diffracted light beam generated by the diffraction grating 39. In FIG. 1, a 0th order diffracted light beam is indicated by solid lines, the +1st order diffracted light beam is indicated by chain lines, and the −1st order diffracted light beam is indicated by two-dot chain lines.

For example, the diffraction grating 39 has a one-dimensional periodic structure. The periodic structure may be either of a structure in which density (transmittance) periodically changes or a structure in which a step (phase difference) periodically changes. In the case where the diffraction grating 39 is a phase diffraction grating, diffraction efficiency of the ±1st order diffracted light beams is high, and loss of light can be reduced when the ±1st order diffracted light beams are used to form interference fringes. It is preferred that the period of interference fringes formed on the sample S be slightly smaller than a resolution limit of an imaging optical system 55 (described later) in the imaging unit 5. When a spatial modulation frequency of interference fringes is set as close as possible to the limit that can be formed by the imaging optical system 55, the resolution of a sample image obtained by demodulation processing can be further increased.

For acquiring a single image of a sample by 2D-SIM, for example, nine modulated images are used for calculation in demodulation processing (demodulation calculation). Thus, in 2D-SIM, the orientation of interference fringes is changed in three ways and the phase of interference fringes is changed in three ways for each orientation of interference fringes, and modulated images are taken in nine states with different combinations of orientations and phases of interference fringes.

The structured illumination microscope 1 according to the first embodiment uses nine modulated images for demodulation calculation to acquire an image of an activated layer of the sample S (described later). The orientation of interference fringes corresponds to the direction in which light intensity periodically changes in the interference fringes (direction orthogonal to direction in which light intensity does not substantially change). For example, the orientation of the interference fringes can be changed by rotating (turning) the diffraction grating 39 about the optical axis AX2 of the second illumination optical system 31. The phase of the interference fringes corresponds to the position of a bright part and the position of a dark part of the interference fringes. For example, the phase of the interference fringes can be changed by moving the diffraction grating 39 in a direction intersecting with the optical axis AX2 of the second illumination optical system 31.

In the first embodiment, the second illumination optical system 31 includes a rotation drive unit 42 configured to rotate the diffraction grating 39 about the optical axis AX2. The rotation drive unit 42 includes an actuator such as an electric motor. The rotation drive unit is controlled by the control unit 7 to rotate the diffraction grating 39. The control unit 7 controls the rotation drive unit 42 to switch the rotation position of the diffraction grating 39 among a first rotation position, a second rotation position, and a third rotation position (illustrated in FIG. 3 referred to later). For example, the second rotation position is a rotation position obtained by rotating the first rotation position by 120°, and the third rotation position is a rotation position obtained by rotating the second rotation position by 120° (by rotating first rotation position by 240°).

In the first embodiment, the second illumination optical system 31 includes a translation drive unit 43 configured to drive the diffraction grating 39 in a direction perpendicular to the optical axis AX2. The translation drive unit 43 includes an actuator such as a piezoelectric element. The translation drive unit 43 is controlled by the control unit 7 to translate the diffraction grating 39. The control unit 7 controls the translation drive unit 43 to control the position of the diffraction grating 39 in a direction parallel to the YZ plane. For example, the control unit 7 controls the translation drive unit 43 such that the phase of the interference fringes is changed by a predetermined amount each time the position of the diffraction grating 39 is changed. The predetermined amount is set to, for example, about ⅓ (for example, phase of $2\pi/3$) of the period of the interference fringes.

The ½ wavelength plate 40 adjusts the polarized state of the exciting light from the diffraction grating 39 such that the polarized state of the exciting light entering the sample S is S-polarization (illustrated in FIG. 3 and FIG. 4 referred to later). The lens 41 condenses the exciting light from the ½ wavelength plate 40 onto a pupil conjugate plane 44. The exciting light is condensed by the lens 41 to a position corresponding to the order of diffracted light beam. For example, the 0th order diffracted light beam in the exciting light is condensed toward the optical axis AX2 on the pupil conjugate plane 44. The +1st order diffracted light beam in the exciting light is condensed toward a position shifted from the optical axis AX2 on the pupil conjugate plane 44. The −1st order diffracted light beam in the exciting light is condensed toward a position symmetric to the condensed position of the +1st order diffracted light beam about the optical axis AX2 on the pupil conjugate plane 44.

The second illumination optical system 31 includes, on the light exit side of the lens 41, a mask 45, a lens 46, a field stop 47, a lens 48, an excitation filter 49, the dichroic mirror 33, and the objective lens 32.

The mask 45 (beam selection unit) transmits diffracted light beams of orders that are used to form interference fringes and blocks diffracted light beams of orders that are not used to form interference fringes among a plurality of diffracted light beams from the diffraction grating 39. In the first embodiment, the ±1st order diffracted light beams are used to form interference fringes, and the mask transmits the ±1st order diffracted light beams and blocks the 0th order diffracted light beam and the other diffracted light beams. For example, the mask 45 is disposed at a pupil conjugate plane 44 (position of aperture stop). The mask 45 only needs to be disposed at a position at which the optical path of the 0th order diffracted light beam, the optical path of the +1st order diffracted light beam, and the optical path of the −1st order diffracted light beam do not overlap with one another, and may be disposed, for example, in the vicinity of the pupil conjugate plane 44.

Figure 2A:
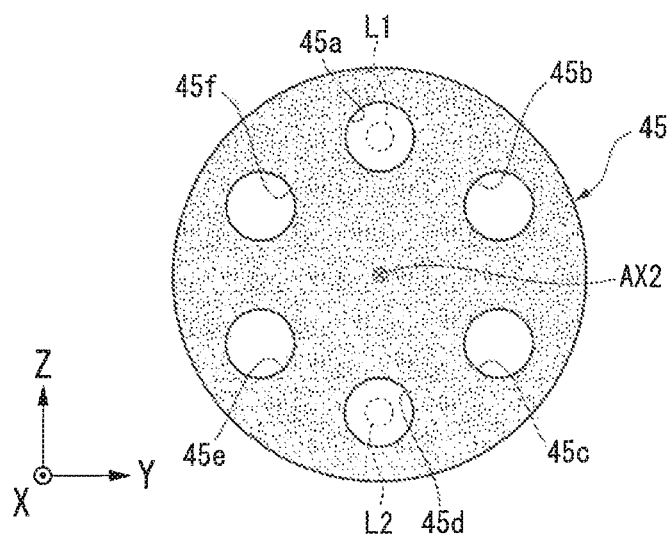
FIGS. 2A and 2B are diagrams illustrating examples of a mask.

FIG. 2A is a diagram illustrating an example of the mask 45. In the mask 45, a portion including the optical axis AX2 is a portion through which the 0th order diffracted light beam enters, and is a light block portion. The mask 45 has opening portions 45a to 45f disposed away from the optical axis AX2 of the second illumination optical system 31. The opening portions 45a to 45d are disposed at every 60° around the optical axis AX2. The opening portion 45a and the opening portion 45d are disposed at positions through which the +1st order diffracted light beam L1 and the −1st order diffracted light beam L2 pass, respectively, when the diffraction grating 39 is disposed at a first rotation position. The opening portion 45c and the opening portion 45f are disposed at positions through which the +1st order diffracted light beam and the −1st order diffracted light beam pass, respectively, when the diffraction grating 39 is disposed at a second rotation position. The opening portion 45b and the opening portion 45e are disposed at positions through which the +1st order diffracted light beam and the −1st order diffracted light beam pass, respectively, when the diffraction grating 39 is disposed at a third rotation position. The inner dimensions of the opening portions 45a to 45f are each set so as to secure an effective diameter through which beams to be used to form interference fringes pass.

Figure 2B:
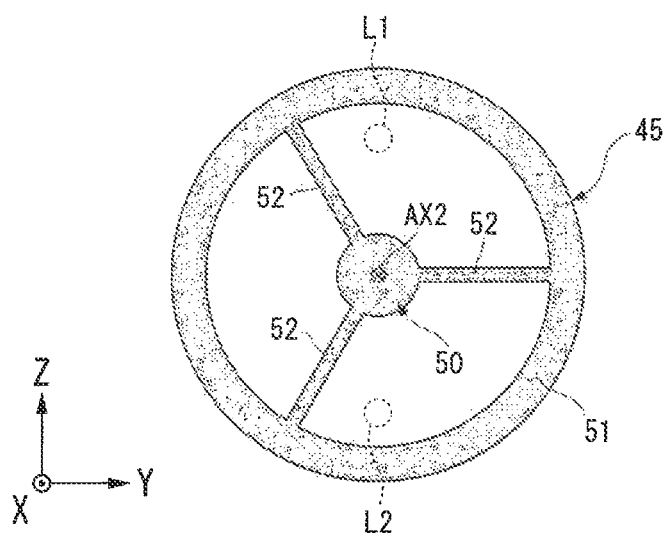

FIG. 2B is a diagram illustrating another example of the mask 45. The mask 45 has a disc-shaped light blocking portion 50 on the optical axis AX2 and in its vicinity. The mask 45 has a ring-shaped outer edge portion 51, and the light blocking portion 50 is supported to the outer edge portion 51 through strip-shaped support portions 52. The support portions 52 are disposed at positions through which the ±1st order diffracted light beams do not pass in any of the cases where the diffraction grating 39 is disposed at the first to third rotation positions.

The lens 46 condenses exciting light (±1 order diffracted light beams) from the mask 45 to the same position for each diffracted light beam generated at each position of the diffraction grating 39. The lens 41 and the lens 46 form an image of the diffraction grating 39. The field stop 47 is disposed at a position optically conjugate with the diffraction grating 39. The field stop 47 has an opening portion through which the exciting light passes. The shape and dimensions of the opening portion define an illumination region of the second illumination optical system 31.

The excitation filter 49 blocks at least a part of light in wavelengths other than the excitation wavelength among light beams from the lens 46. For example, the excitation filter 49 cuts stray light traveling from the light source unit 30 side with respect to the excitation filter 49. The dichroic mirror 33 has characteristics of reflecting the exciting light from the light source unit 30 and transmitting fluorescence from the sample S. For example, the dichroic mirror 33 is provided to be inclined with an angle of about 45° with respect to the X direction. The exciting light from the excitation filter 49 is reflected by the dichroic mirror 33, and the optical path of the exciting light is bent by about 90°. The exciting light travels in the +Z direction to enter the objective lens 32. The objective lens 32 forms an image of the diffraction grating 39 at a position optically conjugate with the field stop 47.

Now, the optical path and the polarized state of the exciting light depending on the rotation position of the diffraction grating 39 are described. FIG. 3 is a diagram illustrating the optical path and the polarized state of the exciting light at each rotation position of the diffraction grating 39. FIG. 4 is a diagram illustrating a condensed region on a pupil plane 32a of the objective lens 32 and a polarized state of exciting light at each rotation position of the diffraction grating 39. In FIG. 3 and FIG. 4, the arrows in circles represent the polarized states of the exciting light.

Symbol Q1 represents the state in which the diffraction grating 39 is disposed at a first rotation position. The first rotation position is freely set. For example, the first rotation position is a rotation position at which a periodic direction D1 of the diffraction grating is parallel to the Z direction. For example, a transmission axis 38a of the polarizing plate 38 is set to be parallel to the Z direction, and a polarized state Q1a of the exciting light that has passed through the polarizing plate 38 is linear polarization in the Z direction. A +1st order diffracted light beam L1 and a −1st order diffracted light beam L2 generated by the diffraction grating 39 are branched so as to be separated away from each other in the periodic direction D1 of the diffraction grating 39. In the optical path between the diffraction grating 39 and the ½ wavelength plate 40, a polarized state Q1b of each diffracted light beam is, for example, linear polarization in the Z direction. In the state Q1, a fast axis 40a of the ½ wavelength plate 40 is set to, for example, a direction at an angle of −45° from the Y direction. The 0th order diffracted light beam among the diffracted light beams that have passed through the ½ wavelength plate 40 is blocked by the mask 45 and removed from the optical path directed to the sample S. The polarized state Q1c of the +1st order diffracted light beam L1 and the −1st order diffracted light beam L2 that have passed through the mask 45 is linear polarization in a direction (Y direction) orthogonal to the periodic direction D1 of the diffraction grating 39.

Figure 4:
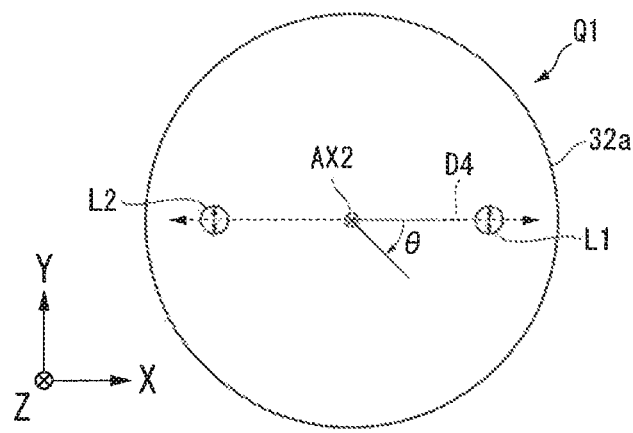
FIG. 4 is a diagram illustrating a position of a condensed region on a pupil plane and a polarized state in the condensed region.
Figure 4:
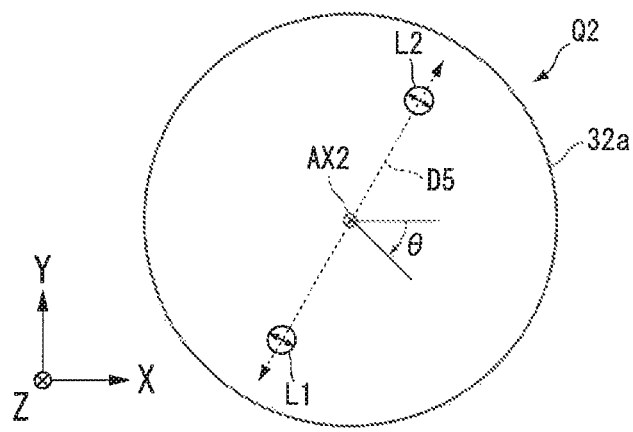
Figure 4:
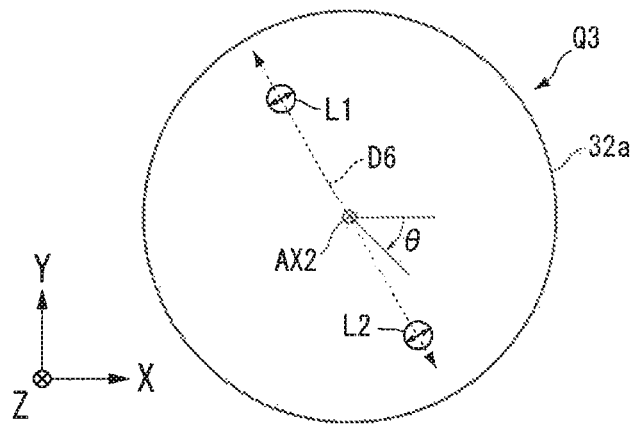

As indicated by the state Q1 in FIG. 4, the +1st order diffracted light beam L1 and the −1st order diffracted light beam L2 are each condensed in a condensed region on the pupil plane 32a of the objective lens 32. The rotation position θ about the optical axis AX2 is represented by an angle that is positive in the clockwise direction viewed in the −Z direction, with the rotation position in the radial direction parallel to the X direction being set to 0°. The condensed region of the +1st order diffracted light beam L1 is disposed at a rotation position of θ=0°, and the condensed region of the −1st order diffracted light beam L2 is disposed at a rotation position of θ=180°. A direction D4 connecting the condensed region of the +1st order diffracted light beam L1 and the condensed region of the −1st order diffracted light beam L2 is parallel to the X direction, and a surface of the sample S through which the ±1 order diffracted light beams enter is a plane (XZ plane) including the optical axis AX2 and parallel to the direction D4. The ±1 order diffracted light beams are linearly polarized in the Y direction and is S-polarized with respect to the sample S.

Figure 3:
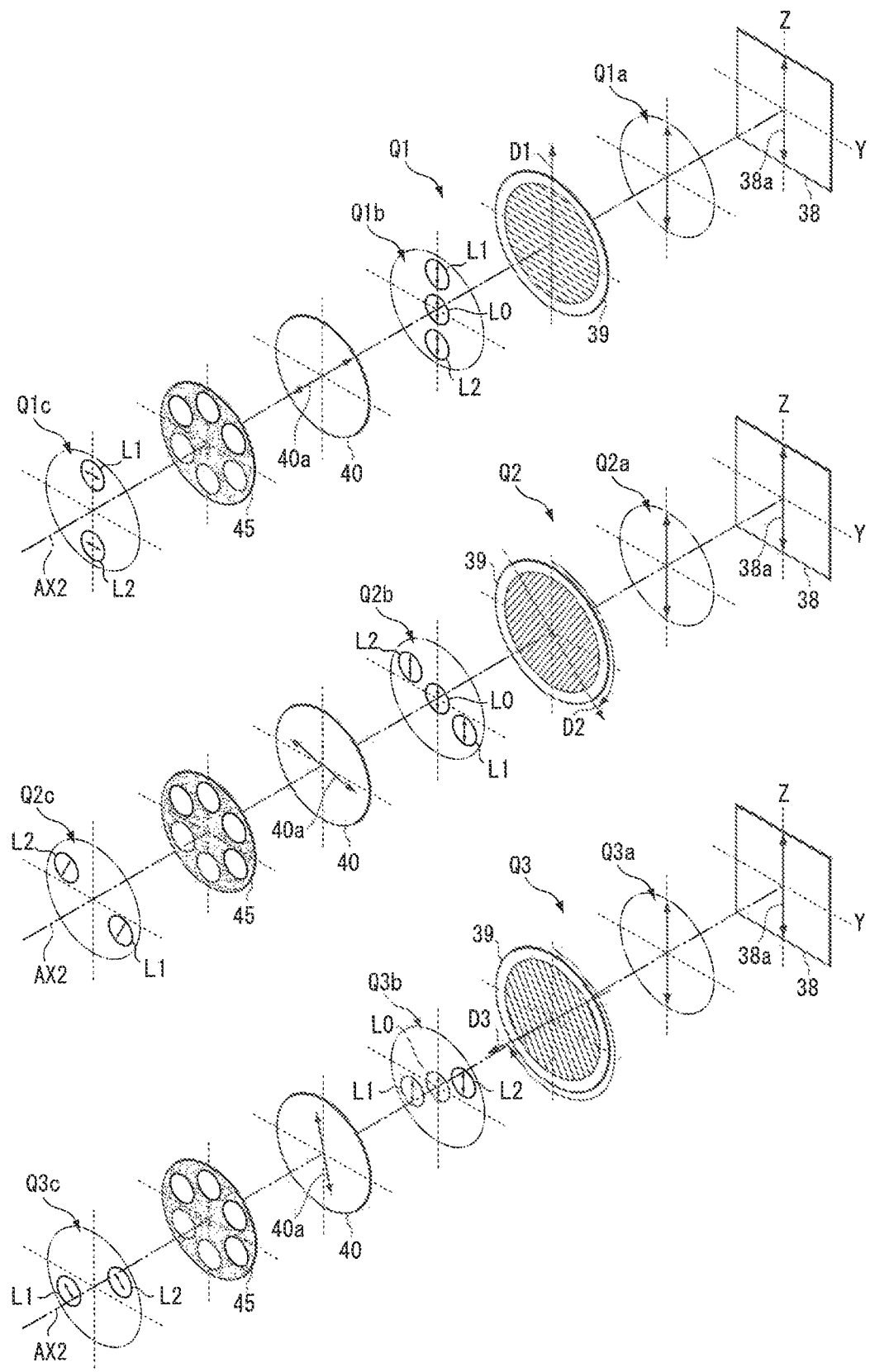
FIG. 3 is a diagram illustrating a polarized state of diffracted light beams in a second illumination optical system.

In FIG. 3 and FIG. 4, symbol Q2 represents the state in which the diffraction grating 39 is disposed at a second rotation position. In the state Q2, an angle between a periodic direction D2 of the diffraction grating 39 and the Z direction is, for example, 120°. A polarized state Q2a of exciting light that has passed through the polarizing plate 38 is, for example, linear polarization in the Z direction. The +1st order diffracted light beam L1 and the −1st order diffracted light beam L2 generated by the diffraction grating 39 are branched to be away from each other in the periodic direction D2 of the diffraction grating 39. In an optical path between the diffraction grating 39 and the ½ wavelength plate 40, a polarized state Q2b of each diffracted light beam is, for example, linear polarization in the Z direction. In the state Q2, a fast axis 40a of the ½ wavelength plate 40 is set to, for example, a direction with an angle of 15° with respect to the Y direction. The 0th order diffracted light beam among the diffracted light beams that have passed through the ½ wavelength plate 40 is blocked by the mask 45 and removed from the optical path directed to the sample S. The polarized state Q2c of the +1st order diffracted light beam L1 and the −1st order diffracted light beam L2 that have passed through the mask 45 is linear polarization in a direction orthogonal to the periodic direction D2 of the diffraction grating 39.

As indicated by the state Q2 in FIG. 4, the +1st order diffracted light beam L1 and the −1st order diffracted light beam L2 are each condensed in a condensed region on the pupil plane 32a of the objective lens 32. The condensed region of the +1st order diffracted light beam L1 is disposed at a rotation position of θ=120°, and the condensed region of the −1st order diffracted light beam L2 is disposed at a rotation position of θ=300°. A direction D5 connecting the condensed region of the +1st order diffracted light beam L1 and the condensed region of the −1st order diffracted light beam L2 is a direction with an angle of 120°, provided that the angle in the clock direction from the +X direction is positive. A surface of the sample S through which the ±1 order diffracted light beams enter is a plane including the optical axis AX2 and parallel to the direction D5. The ±1 order diffracted light beams are linearly polarized in a direction orthogonal to the direction D5 and is S-polarized with respect to the sample S.

In FIG. 3 and FIG. 4, symbol Q3 represents the state in which the diffraction grating 39 is disposed at a third rotation position. In the state Q3, an angle between a periodic direction D3 of the diffraction grating 39 and the Z direction is, for example, 240°. A polarized state Q3a of exciting light that has passed through the polarizing plate 38 is, for example, linear polarization in the Z direction. The +1st order diffracted light beam L1 and the −1st order diffracted light beam L2 generated by the diffraction grating 39 are branched to be away from each other in the periodic direction D3 of the diffraction grating 39. In an optical path between the diffraction grating 39 and the ½ wavelength plate 40, a polarized state Q3b of each diffracted light beam is, for example, linear polarization in the Z direction. In the state Q3, the fast axis 40a of the ½ wavelength plate 40 is set to, for example, a direction with an angle of 75° with respect to the Y direction. The 0th order diffracted light beam among the diffracted light beams that have passed through the ½ wavelength plate 40 is blocked by the mask 45 and removed from the optical path directed to the sample S. The polarized state Q3c of the +1st order diffracted light beam L1 and the −1st order diffracted light beam L2 that have passed through the mask 45 is linear polarization in a direction orthogonal to the periodic direction D3 of the diffraction grating 39.

As indicated by the state Q3 in FIG. 4, the +1st order diffracted light beam L1 and the −1st order diffracted light beam L2 are each condensed in a condensed region on the pupil plane 32a of the objective lens 32. The condensed region of the +1st order diffracted light beam L1 is disposed at a rotation position of θ=240°, and the condensed region of the −1st order diffracted light beam L2 is disposed at a rotation position of θ=60°. A direction D6 connecting the condensed region of the +1st order diffracted light beam L1 and the condensed region of the −1st order diffracted light beam L2 is a direction with an angle of 240°, provided that the angle in the clockwise direction from the +X direction is positive. A surface of the sample S through which the ±1 order diffracted light beams enter is a plane including the optical axis AX2 and parallel to the direction D6. The ±1 order diffracted light beams are linearly polarized in a direction orthogonal to the direction D6 and is S-polarized with respect to the sample S.

The ½ wavelength plate 40 may be rotated to adjust the polarized state of the ±1 order diffracted light beams depending on the rotation position of the diffraction grating 39. For example, when the control unit 7 controls the rotation drive unit 42 to rotate the diffraction grating 39 by 120°, the ½ wavelength plate 40 may be rotated by 60°. Depending on the rotation position of the diffraction grating 39, the ½ wavelength plate 40 may be fixed for each opening portion in the mask 45 illustrated in FIG. 2A through which either of the ±1 order diffracted light beams passes. In this case, the direction of the fast axis of the ½ wavelength plate 40 for each opening portion is set depending on the position of the opening portion.

In the manner described above, the exciting illumination unit 4 illustrated in FIG. 1 forms interference fringes by the ±1 order diffracted light beams in an illumination region set in an activated layer of the sample S, and a fluorescent substance activated in the activated layer of the sample S emits fluorescence by exciting light. Using the fluorescence, a modulated image obtained by modulating fluorescence density distribution in the sample S by interference fringes can be obtained.

The imaging unit 5 takes a modulated image obtained by modulating the sample S with the interference fringes. The imaging unit 5 includes an imaging optical system 55 and an imaging element 56. The imaging optical system 55 includes an objective lens 32, a dichroic mirror 33, a barrier filter 57, and a lens 58.

The fluorescence from the sample S passes through the objective lens 32 to be converted into collimated light, and is transmitted through the dichroic mirror 33 to enter the barrier filter 57. The barrier filter 57 blocks at least a part of light in a wavelength band other than the wavelength of the fluorescence from the sample S. The lens 58 forms an image plane whose object plane is the sample S (illumination region of exciting illumination unit 4) together with the objective lens 32. Specifically, the objective lens 32 and the lens 58 form a modulated image of the sample S. A focus position of the imaging optical system 55 is set, for example, within the illumination region of the activating illumination unit 3 in the Z direction.

The imaging element 56 includes an image sensor such as a CCD sensor and a CMOS sensor. The imaging element 56 has a light receiving surface on which pixels are arranged. The light receiving surface is disposed on an imaging plane of the imaging optical system 55 (plane optically conjugate with sample S). On the light receiving surface, a photoelectric conversion unit such as a photodiode is disposed at each pixel. The imaging element 56 converts fluorescence from the sample S into electric charges by the photoelectric conversion unit, thereby detecting the fluorescence from the sample S.

In this manner, the imaging unit 5 takes a modulated image and supplies the result of the imaging (hereinafter referred to as "modulated image") to the demodulation unit 6. The demodulation unit 6 executes demodulation processing by using the result of imaging the modulated image, and generates an image of the sample S. The demodulation unit 6 can generate a restored image by using modulated images taken with different orientations and directions of the interference fringes. For example, the demodulation unit 6 can perform the demodulation processing disclosed in U.S. Pat. No. 8,115,806, but the demodulation processing is not limited to this method.

In the first embodiment, the structured illumination microscope 1 can be configured that a part of the sample S to be observed in the thickness direction (hereinafter referred to as "observed plane") is maintained in the illumination region of the activating illumination unit 3, and the observed plane is selectively activated by the activating illumination unit 3. The structured illumination microscope 1 can be configured that, while at least a part of the sample S in the thickness direction other than the observed plane is maintained in an inactive state, the observed plane is irradiated with interference fringes from the exciting illumination unit 4. In this manner, the structured illumination microscope 1 can selectively cause the observed plane in the sample S to generate fluorescence, and modulated images of the observed plane can be taken by the imaging unit 5. By demodulating the modulated images, a super-resolution image with a resolution higher than the resolution limit of the imaging optical system 55 is obtained.

The structured illumination microscope 1 in the first embodiment can suppress the generation of fluorescence from parts other than an observed plane in the sample S, and hence can suppress background light to be small with respect to fluorescence from the observed plane. As a result, the structured illumination microscope 1 can suppress the reduction of image quality when generating a super-resolution image of a sample S having a thickness larger than the depth of focus of the imaging optical system 55.

Figure 5:
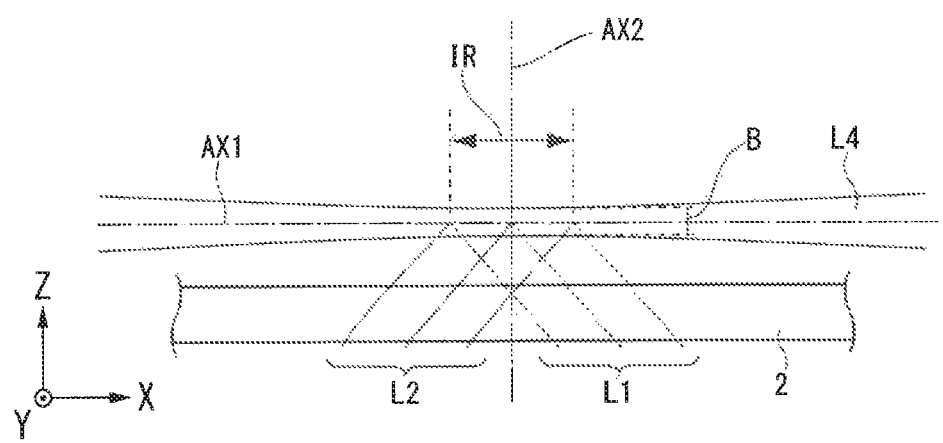
FIG. 5 is a diagram illustrating activating light from an activating illumination unit and an illumination region of an exciting illumination unit.

FIG. 5 is a diagram illustrating activating light L4 from the activating illumination unit 3 and an illumination region IR of the exciting illumination unit 4. FIG. 5 illustrates the state in which the optical axis AX1 of the activating illumination unit 3 is set so as to pass through the optical axis AX2 of the exciting illumination unit 4. In the first embodiment, the optical axis AX1 of the activating illumination unit 3 is fixed so as to pass through the optical axis AX2 of the exciting illumination unit 4.

For example, the illumination region IR of the exciting illumination unit 4 is set to a position optically conjugate with the light receiving surface of the imaging element 56. For example, the range to be irradiated with the activating light L4 from the activating illumination unit 3 is set to the range including the illumination region IR. For example, the activating illumination unit 3 irradiates a range wider than the illumination region IR with the sheet-shaped activating light L4 in a plane parallel to the XY plane.

The range to be irradiated with the activating light L4 from the activating illumination unit 3 may be set to a position shifted from the illumination region IR in the Z direction. In this case, after a part of the sample S in the Z direction is activated, the sample S may be moved in the Z direction by the stage 2 such that an activated layer is disposed in the illumination region IR of the exciting illumination unit 4, and the irradiation of exciting light to the activated layer and the taking of modulated images of the activated layer may be executed. In the structured illumination microscope 1, the relative positions of the range to be irradiated with the activating light from the activating illumination unit 3 and the illumination region IR of the exciting illumination unit 4 may be variable (described in the modifications).

A thickness B of the activating light L4 in the illumination region IR of the exciting illumination unit 4 is set to be, for example, equal to or smaller than 1 µm, and equal to or smaller than the thickness of the sample S in the Z direction. By changing the position (height) of the activating light L4, specifically, the stage 2 in the Z direction, modulated images of each of observed planes in the sample S with different positions in the Z direction can be acquired. In the case of observing the sample S while changing the position of the stage 2 in the Z direction in a stepwise manner, for example, the step amount of the position of the stage 2 in the Z direction may be set to the same value as the thickness B of the activating light or may be set to be a value larger than the thickness B or a value smaller than the thickness B. For example, the thickness B of the activating light L4 may be set in the range equal to or smaller than the depth of focus of the imaging optical system 55. In this case, fluorescence is less detected from parts of the sample S other than an observed plane.

In the first embodiment, the structured illumination microscope 1 includes a control device CONT. The control unit 7 and the demodulation unit 6 are provided in the control device CONT. The control device CONT includes, for example, a computer system, and executes various kinds of processing in accordance with a control program read from a storage device (not shown). For example, the control program causes a computer to execute control of processing including irradiating, from a first direction, a sample with activating light for activating a fluorescent substance included in the sample, irradiating, from a second direction that is different from the first direction, the sample with exciting light for exciting the fluorescent substance in a fringes, controlling a direction and a phase of the interference fringes, forming an image of the sample irradiated with the interference fringes, taking the image to generate a first image, and generating a second image by using a plurality of the first images generated by the taking.

The control device CONT is connected to a display device 59 such as a liquid crystal display, and can control the display device 59 to display an image (for example, super-resolution image) indicating observation results and an image indicating the settings of the structured illumination microscope 1. The control device CONT is further connected to an input device (not shown) such as a keyboard, a mouse, and a touch panel. For example, the input device receives, from a user, inputs of information such as observation conditions, the settings of the structured illumination microscope 1, and instructions. Examples of the observation conditions include the position of a part of the sample S to be observed. Examples of the settings of the structured illumination microscope 1 include the setting of an observation mode. Examples of the instructions include the start, interruption, restart, finish of the observation.

Figure 6:
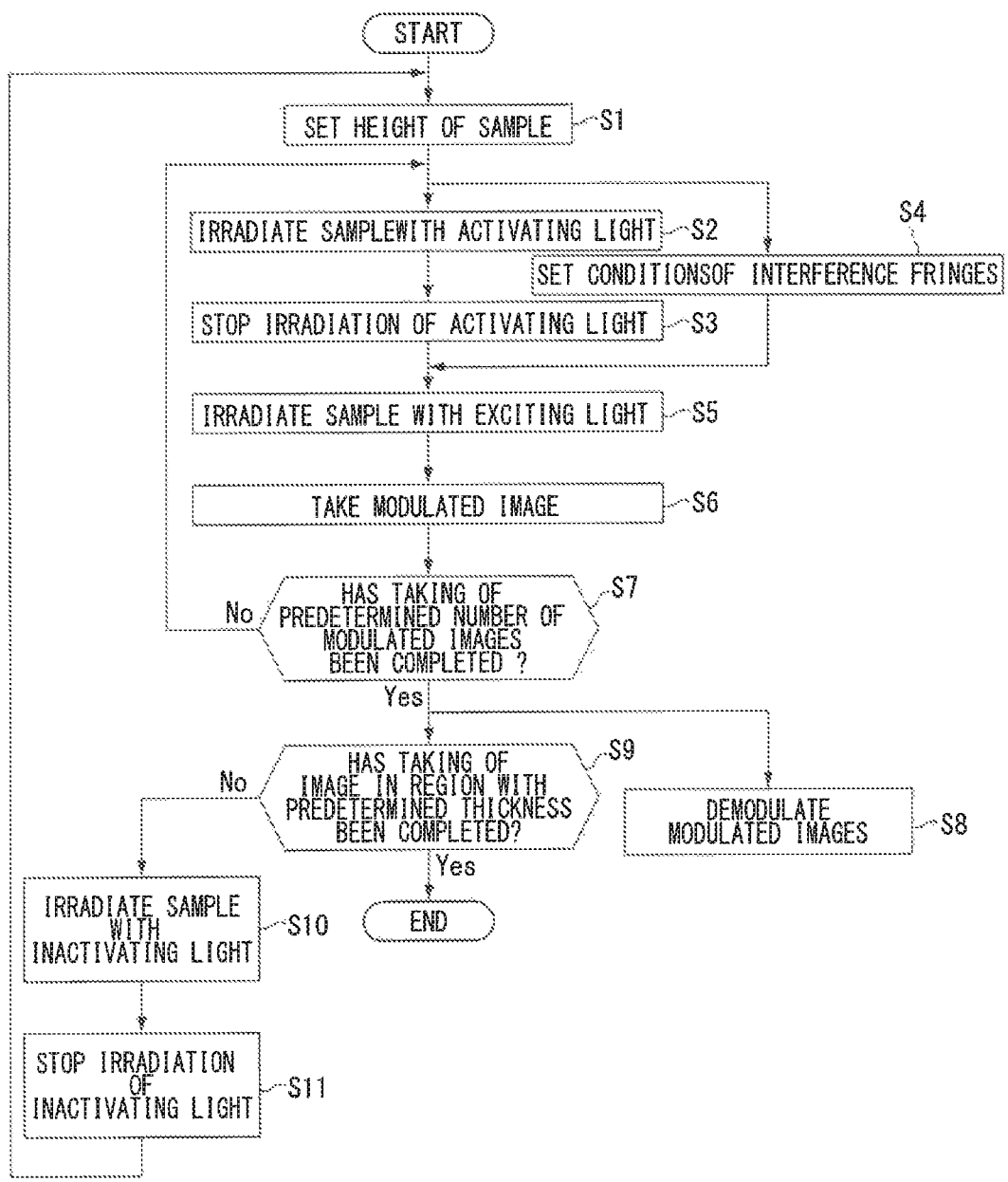
FIG. 6 is a flowchart illustrating an example of operation of the structured illumination microscope.

Next, a method of observing a sample S on the basis of the operation of the above-mentioned structured illumination microscope 1 is described. FIG. 6 is a flowchart illustrating the operation of the structured illumination microscope 1. At Step S1, the structured illumination microscope 1 sets the height (position in Z direction) of the sample S. For example, the control unit 7 in the control device CONT controls the stage 2 to dispose an observed plane in the sample S designated by a user in the illumination region of the activating illumination unit 3.

At Step S2, the structured illumination microscope 1 irradiates the sample S with activating light from the activating illumination unit 3. For example, the control unit 7 controls the light source unit 10 to irradiate the sample S with a predetermined light amount of the activating light. A set value of the light amount is defined by, for example, irradiation time, light emission intensity of the light source unit 10, or power supplied to the light source unit 10. For example, the set value of the light amount is set to a level that can saturate the activation of a fluorescent dye on the observed plane in the sample S. At Step S3, in the structured illumination microscope 1, for example, the control unit 7 controls the light source unit 10 to stop the irradiation of the activating light to the sample S from the activating illumination unit 3.

At Step S4, the structured illumination microscope 1 sets conditions of interference fringes formed by the exciting illumination unit 4. The conditions of the interference fringes include at least one of the phase or the orientation of the interference fringes. For example, when the phase of the interference fringes is to be changed in the next imaging, the control unit 7 controls the translation drive unit 43 to control the position of the diffraction grating 39. When the orientation of the interference fringes is to be changed in the next imaging, the control unit 7 controls the rotation drive unit 42 to control the rotation position of the diffraction grating 39. The processing of Step S4 may be executed in parallel to the processing of Step S2, or may be executed in a period not overlapping with the processing of Step S2.

After the processing of Step S3 and the processing of Step S4 are finished, the structured illumination microscope 1 irradiates the sample S with exciting light from the exciting illumination unit 4 at Step S5. At Step S6, the structured illumination microscope 1 takes an image of the sample S irradiated with the exciting light by the imaging unit 5. For example, the control unit 7 controls the light source unit 30 such that the exciting illumination unit 4 irradiates the sample S with the exciting light, and controls the imaging unit 5 to take an image of the sample S at a timing determined in advance for the irradiation of the exciting light.

At Step S7, the structured illumination microscope 1 determines whether the taking of a predetermined number of images has been completed. For example, when the number of modulated images necessary for demodulation calculation by the demodulation unit 6 is nine, the control unit 7 determines whether the nine modulated images have been taken. When the control unit 7 determines that the taking of a predetermined number of images has not been completed (No at Step S7), the control unit 7 executes the processing from Step S2 to Step S6. When the control unit 7 determines that the taking of a predetermined number of images has been completed (Yes at Step S7), the control unit 7 controls the demodulation unit 6 to execute demodulation processing on the basis of the acquired modulated images (Step S8).

At Step S9, the control unit 7 determines whether the taking of an image in an observation region of the sample S in the depth direction has been completed. For example, the observation region in the depth direction is defined by observation conditions designated by the user. For example, the user can designate an observation region by designating two positions of an observation start position and an observation finish position in the depth direction. In the first embodiment, the control unit 7 in the control device CONT repeats the processing of changing the observed plane and acquiring a modulated image while moving the stage 2 until the stage 2 reaches the observation finish position designated by the user, thereby generating a super-resolution image of a predetermined thickness part. When the control unit 7 determines that the taking of an image in the predetermined observation region in the depth direction has not been completed (No at Step S9), at Step S10, the control unit 7 irradiates the sample S with inactivating light from the inactivating illumination unit 20. For example, the control unit 7 stops the irradiation of the inactivating light from the inactivating illumination unit 20 after the sample S is irradiated with a predetermined light amount of the inactivating light from the inactivating illumination unit 20 (Step S11). After the processing of Step S11, the structured illumination microscope 1 executes the processing from Step S1 to Step S8 to generate a super-resolution image of the next observed plane. When the control unit 7 determines that the taking of an image of a portion corresponding to the observation region in the depth direction has been completed (Yes at Step S9), the control unit 7 finishes the series of processing.

In the above-mentioned first embodiment, the case where the sample S is irradiated with activating light each time a single modulated image is taken has been described. When irradiated with exciting light, a part of a fluorescent substance is inactivated in some cases. Thus, by irradiating the sample S with activating light each time a modulated image is taken, the fluorescent substance inactivated by the exciting light can be activated again to take a modulated image.

For example, in the case where the direction of interference fringes is changed in three ways and the phase of the interference fringes is changed in three ways for each direction of the interference fringes, the structured illumination microscope 1 takes a modulated image for each of nine combinations of directions and phases of the interference fringes, and irradiates the sample S with activating light each time a single modulated image is taken.

The structured illumination microscope 1 may irradiate the sample S with activating light each time modulated images are taken. For example, the structured illumination microscope 1 may be configured such that the processing of irradiating the sample S with activating light is performed once for the processing of taking three modulated images while changing the phase of interference fringes. The structured illumination microscope 1 may be configured such that the processing of irradiating the sample S with activating light is performed once for the processing of changing a combination of the direction and phase of interference fringes in nine patterns and taking nine modulated images. The structured illumination microscope 1 may be configured such that the activating illumination unit 3 irradiates the sample S with activating light at the same time when the exciting illumination unit 4 irradiates the sample S with exciting light, and the imaging unit 5 takes an image of the sample S.

The case where one sample S includes observed planes has been described above, but the number of the observed planes may be one. In this case, a fluorescent dye in the sample S is not required to be inactivated, and the inactivating illumination unit 20 can be omitted. In the inactivating illumination unit 20, the activating illumination unit 3 and the first illumination optical system 11 are shared, but the sample may be irradiated with inactivating light from an optical path different from that of the first illumination optical system 11. The inactivating light applied from the inactivating illumination unit 20 is not necessarily required to have a sheet shape. The structured illumination microscope 1 may use the exciting illumination unit 4 as the inactivating illumination unit 20.

At Step S3, the control unit 7 stops the irradiation of the activating light on the basis of the light amount of the activating light set in advance, but may detect the level of activation of a fluorescent dye in the sample S and stop the irradiation of the activating light on the basis of the detection result.

Figure 7:
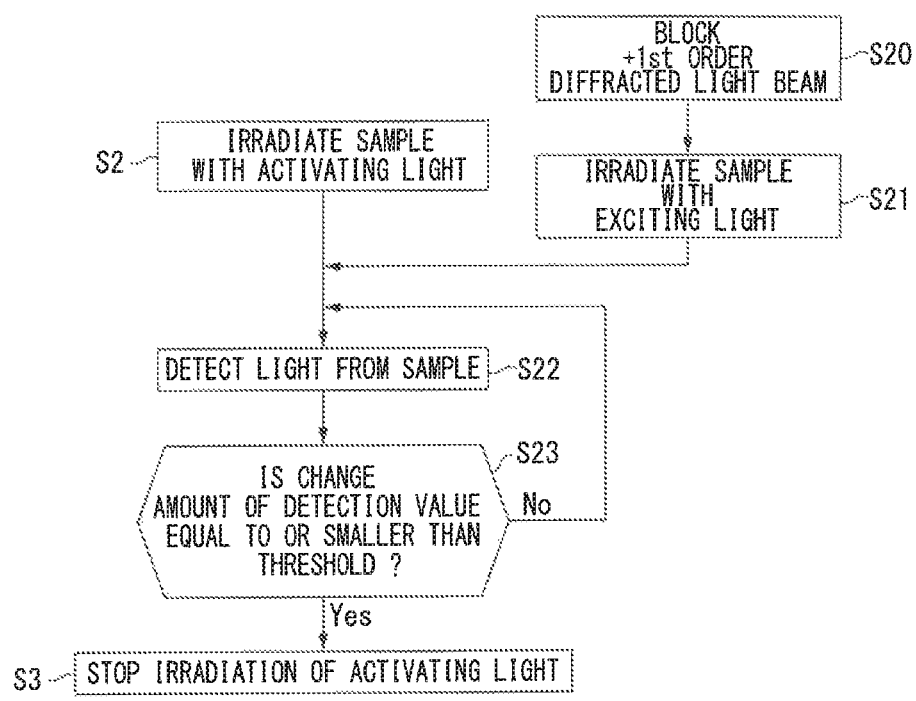
FIG. 7 is a flowchart illustrating processing of detecting the level of activation of a fluorescent dye.

FIG. 7 is a flowchart illustrating an example of processing of detecting the level of activation of a fluorescent dye in a sample S. At Step S20, the control unit 7 controls the exciting illumination unit 4 to block the +1st order diffracted light beam. For example, a shutter is provided in advance to the opening portion in the mask 45 illustrated in FIGS. 2A and 2B, and the control unit 7 closes the shutter such that the sample S is not irradiated with the +1st order diffracted light beam. At Step S21, the control unit 7 controls the light source unit 30 to irradiate the sample S with the −1st order diffracted light beam from the exciting illumination unit 4. In this case, the +1st order diffracted light beam is blocked, and hence interference fringes are not formed on the sample S, and the exciting illumination unit 4 can illuminate the sample S with more uniform brightness than when the +1st order diffracted light beam is not blocked.

At Step S22, for example, the control unit 7 controls the imaging element 56 to detect fluorescence from the sample S while continuing the irradiation of the exciting light to the sample S. At Step S23, the control unit 7 determines whether a temporal change amount of a detection value of the imaging element 56 is equal to or smaller than a threshold. The state in which the temporal change amount of the detection value of the imaging unit 5 is equal to or smaller than the threshold corresponds to the state in which the level of activation of the fluorescent dye in the sample S is almost saturated. When the control unit 7 determines that the temporal change amount of the detection value of the imaging element 56 is larger than the threshold (No at Step S23), the control unit 7 repeats the processing of Step S22 and Step S23. When the control unit determines that the temporal change amount of the detection value of the imaging element 56 is equal to or smaller than the threshold (Yes at Step S23), the control unit 7 stops the irradiation of the activating light at Step S3. In this manner, the control unit 7 irradiates the sample S with the activating light until the activated state of the fluorescent substance is determined to be the saturated state. In this case, the structured illumination microscope 1 can take an image of the sample S under the state in which the level of activation of the fluorescent dye in the sample S is almost saturated. The control unit 7 may determine that the activated state of the fluorescent substance becomes the saturated state when the detection value of the imaging element 56 is equal to or larger than a threshold, and may stop the irradiation of the activating light.

The structured illumination microscope 1 may detect the level of activation of a fluorescent dye in the sample S while illuminating the sample S with interference fringes. In this case, the processing of Step S20 may be omitted. The structured illumination microscope 1 may irradiate the sample S with exciting light to take a modulated image of the sample S in a state in which the level of activation of a fluorescent dye in the sample S is not saturated. For example, if the level of activation of a fluorescent dye in the sample S is saturated, the brightness of a modulated image may be excessive. In another example, the irradiation of the activating light may be stopped before the level of activation of a fluorescent dye is saturated in order to reduce the influence of the irradiation of the activating light on the sample S. In such cases, it may be determined whether the detection value of the imaging element 56 is equal to or smaller than a threshold instead of the determination processing of Step S23 or in addition to the determination processing of Step S23.

At Step S11 illustrated in FIG. 6, the control unit 7 stops the irradiation of inactivating light on the basis of the light amount of the inactivating light set in advance, but may detect the level of inactivation of a fluorescent dye in the sample S and stop the irradiation of the activating light on the basis of the detection result.

Figure 8:
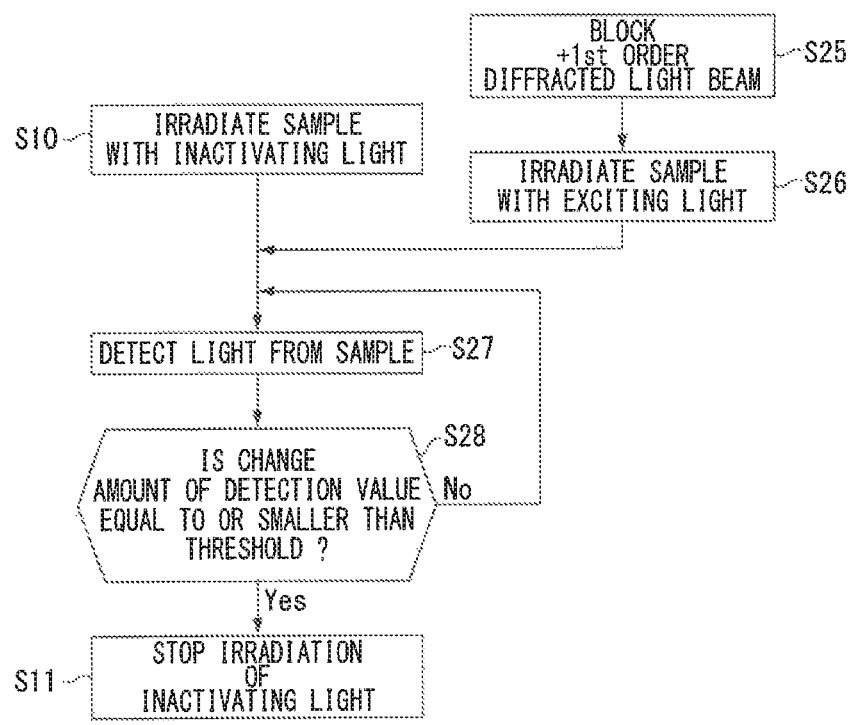
FIG. 8 is a flowchart illustrating processing of detecting the level of inactivation of a fluorescent dye.

FIG. 8 is a flowchart illustrating an example of processing of detecting the level of inactivation of a fluorescent dye in a sample S. At Step S25, the control unit 7 controls the exciting illumination unit 4 to block the +1st order diffracted light beam. At Step S26, the control unit 7 controls the exciting illumination unit 4 to irradiate the sample S with the −1st order diffracted light beam. The processing at Step S25 and Step S26 may be the same as the processing at Step S20 and Step S21 illustrated in FIG. 7.

At Step S27, for example, the control unit 7 controls the imaging element 56 to detect fluorescence from the sample S while continuing the irradiation of the exciting light to the sample S. At Step S28, the control unit 7 determines whether a temporal change amount of a detection value of the imaging element 56 is equal to or smaller than a threshold. The state in which the temporal change amount of the detection value of the imaging element 56 is equal to or smaller than the threshold corresponds to the state in which the level of inactivation of the fluorescent dye in the sample S is almost saturated. When the control unit 7 detects that the temporal change amount of the detection value of the imaging element 56 is larger than the threshold (No at Step S28), the control unit 7 repeats the processing of Step S27 and Step S28. When the control unit 7 detects that the temporal change amount of the detection value of the imaging element 56 is equal to or smaller than the threshold (Yes at Step S28), the control unit 7 stops the irradiation of the inactivating light at Step S11. In this case, the structured illumination microscope 1 can take a modulated image of the next observed plane under the state in which the level of inactivation of the fluorescent dye in the sample S is almost saturated. Thus, when the next observed plane is irradiated with exciting light, the generation of fluorescence from the previous observed plane can be suppressed. At Step S28, the control unit 7 may determine whether the detection value of the imaging element 56 is equal to or smaller than a threshold instead of determining whether the temporal change of the detection value of the imaging element 56 is equal to or smaller than the threshold.

The activating illumination unit 3 only needs to selectively illuminate a sheet-shaped region of the sample S, and is not limited to the configuration in the above-mentioned embodiment. Modifications of the activating illumination unit 3 are described below.

Figure 9A:
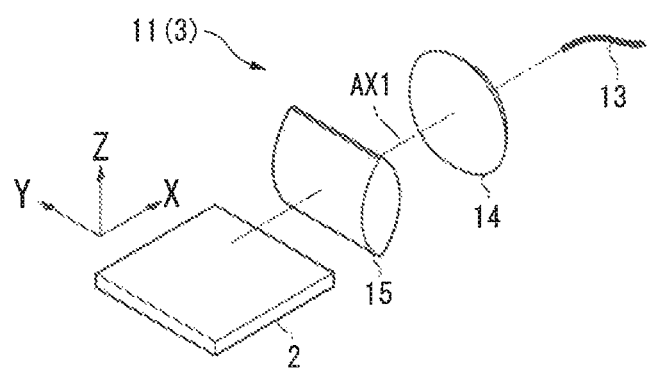
FIGS. 9A and 9B are diagrams illustrating a first modification of the activating illumination unit.
Figure 9B:
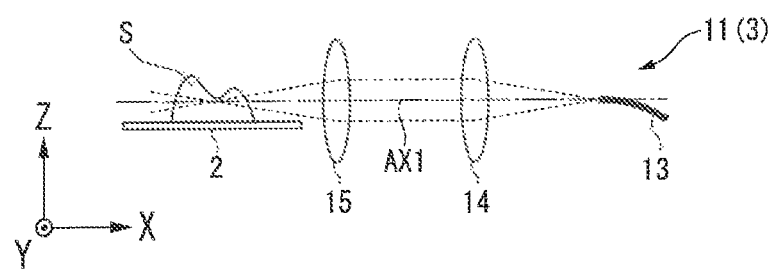

FIG. 9A is a perspective view illustrating a first illumination optical system 11 in a first modification. FIG. 9B is a diagram illustrating an optical path in the first illumination optical system 11 in the first modification. The first illumination optical system 11 includes, on the light exit side of an optical fiber 13, a collimator lens and a cylindrical lens 15. The configuration of the first illumination optical system 11 is obtained by omitting the slit 16 and the lens group 17 from the configuration illustrated in FIG. 1. As described above, the activating illumination unit 3 is not necessarily required to form beams by the slit 16, and in this case, the lens group 17 configured to project an image of the slit 16 can be omitted.

Figure 10A:
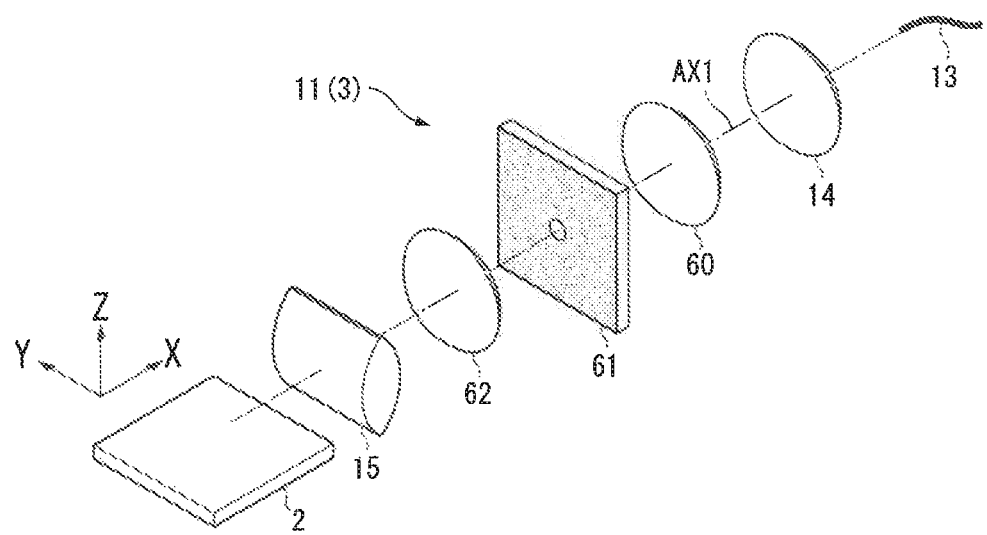
FIGS. 10A and 10B are diagrams illustrating a second modification of the activating illumination unit.
Figure 10B:
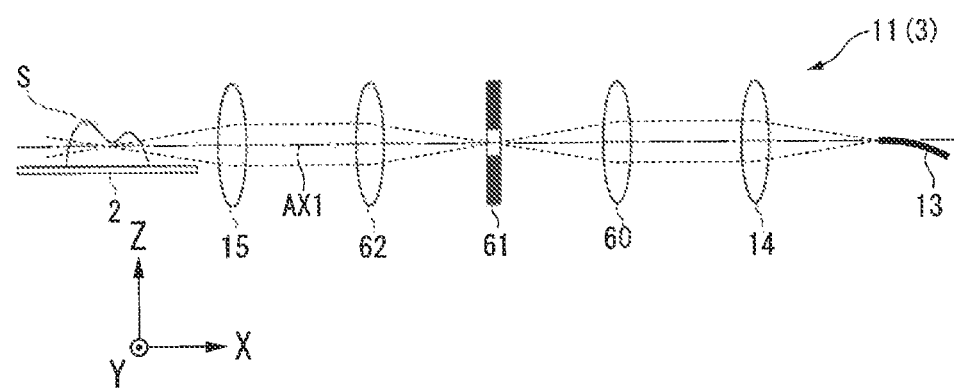

FIG. 10A is a perspective view illustrating a first illumination optical system 11 in a second modification. FIG. 10B is a diagram illustrating an optical path in the first illumination optical system 11 in the second modification. The first illumination optical system 11 includes, from an optical fiber 13 side toward a sample S side, a collimator lens 14, a condensing lens 60, a pinhole 61, a collimator lens 62, and a cylindrical lens 15. The pinhole 61 has, for example, a circular opening. The condensing lens 60 condenses activating light from the collimator lens 14 toward the opening in the pinhole 61. The collimator lens 62 collimates the activating light from the pinhole 61. The cylindrical lens 15 refracts the activating light from the collimator lens 62 on a plane parallel to the XZ plane, but hardly refracts the activating light from the collimator lens 62 on a plane parallel to the XY plane. As in the above-described configuration, the first illumination optical system 11 can shape the activating light into a sheet shape. In this manner, when the cylindrical lens 15 is used to form sheet-shaped activation, the arrangement of the cylindrical lens 15 can be changed.

Figure 11A:
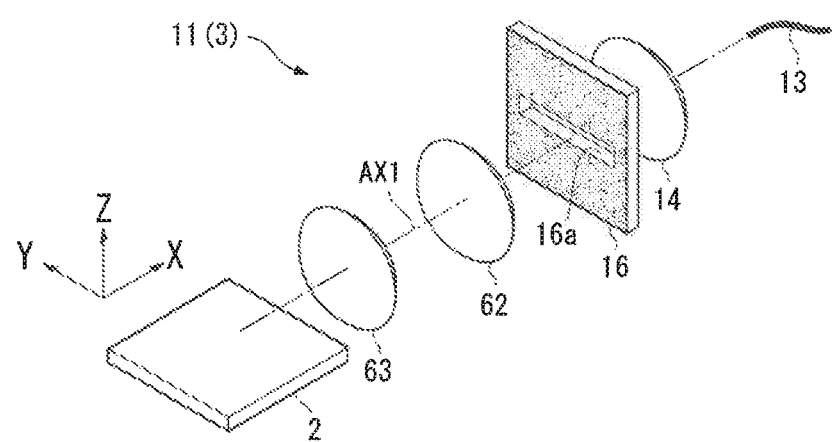
FIGS. 11A and 11B are diagrams illustrating a third modification of the activating illumination unit.
Figure 11B:
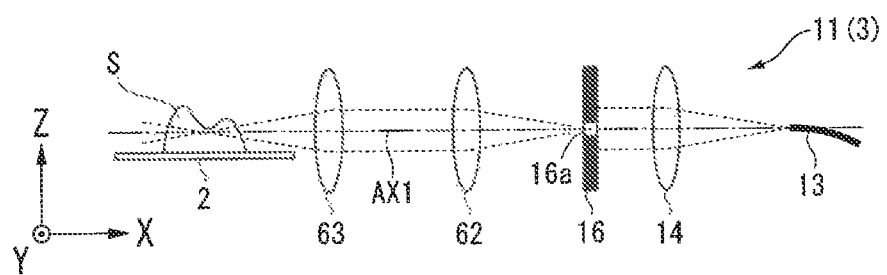

FIG. 11A is a perspective view illustrating a first illumination optical system 11 in a third modification. FIG. 11B is a diagram illustrating an optical path in the first illumination optical system 11 in the third modification. The first illumination optical system 11 includes, on the light exit side of an optical fiber 13, a collimator lens 14, a slit 16, a collimator lens 62, and a lens 63. The slit 16 has an opening portion 16a that is narrower in the Z direction than the beam diameter of inactivating light from the collimator lens 14. The slit 16 is disposed at a rear focus position of the collimator lens 62. The opening portion 16a (see FIG. 11A) has a shape whose lateral direction is the Z direction rather than the Y direction (for example, rectangle having short sides parallel to Z direction). The lens 63 and the collimator lens 62 are disposed such that a front focus position of the lens 63 matches with the rear focus position of the collimator lens 62. The collimator lens 62 and the lens 63 condense the activating light that has passed through the opening portion 16a in the slit 16 onto an illumination region while forming the activating light into a sheet shape.

Figure 12A:
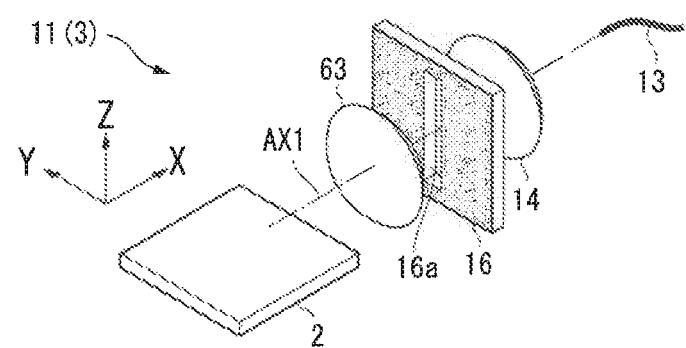
FIGS. 12A and 12B are diagrams illustrating a fourth modification of the activating illumination unit.
Figure 12B:
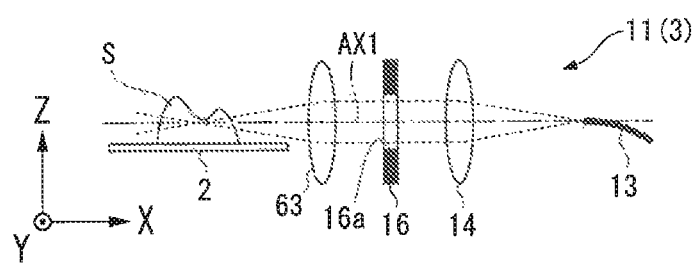

FIG. 12A is a perspective view illustrating a first illumination optical system 11 in a fourth modification. FIG. 12B is a diagram illustrating an optical path in the first illumination optical system 11 in the fourth modification. The first illumination optical system 11 includes on the light exit side of an optical fiber 13, a collimator lens 14, a slit 16, and a lens 63. An opening portion 16a in the slit 16 has a shape whose lateral direction is the Y direction rather than the Z direction. For example, the dimension of the opening portion 16a in the slit 16 in the longitudinal direction (Z direction) is set to be smaller than the beam diameter of the activating light from the collimator lens 14. The slit 16 is disposed at a rear focus position of the lens 63. The lens 63 condenses the activating light that has passed through the opening portion 16a in the slit 16 onto an illumination region. In this manner, the first illumination optical system 11 may shape the activating light by the slit 16, and is not necessarily required to include a cylindrical lens.

Figure 13A:
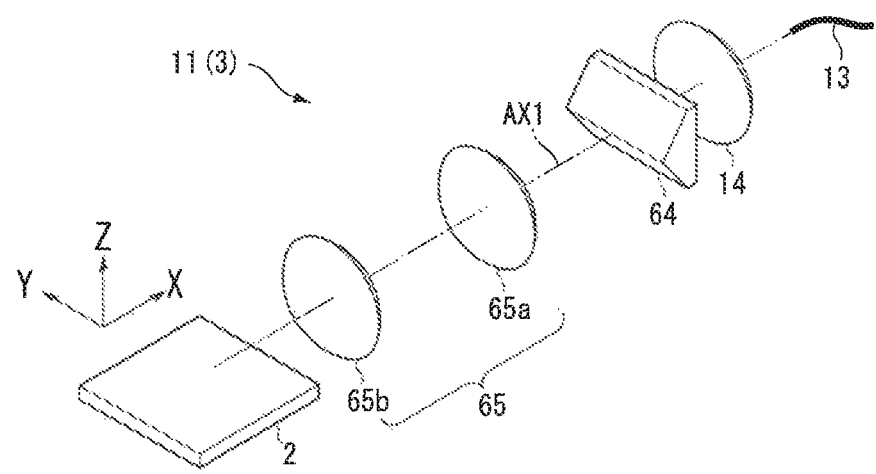
FIGS. 13A and 13B are diagrams illustrating a fifth modification of the activating illumination unit.
Figure 13B:
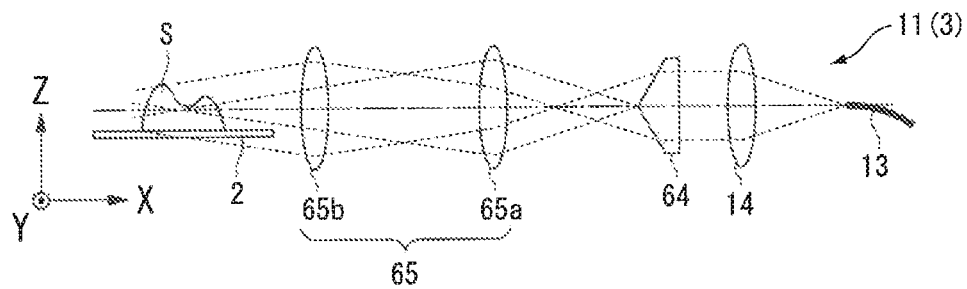

FIG. 13A is a perspective view illustrating a first illumination optical system 11 in a fifth modification. FIG. 13B is a diagram illustrating an optical path in the first illumination optical system 11 in the fifth modification. The first illumination optical system 11 includes, on the light exit side of an optical fiber 13, a collimator lens 14, a triangular prism 64 with an obtuse apex angle on the optical axis AX1, and a lens group 65. The triangular prism 64 has an axisymmetric shape about the optical axis AX1 of the first illumination optical system 11. The triangular prism 64 condenses activating light onto two locations at positions of pupil planes of the lens group 65 (lens 65a and lens 65b). When the condensed activating light beams are projected on a sample by the lens 65b, the light projected to the sample becomes sheet light that is a Bessel beam in the Z direction. In this manner, the first illumination optical system 11 irradiates the sample S with sheet light that is a Bessel beam in the Z direction as activating light. Such a first illumination optical system 11 can increase the depth of focus and reduce the thickness in the illumination region. The first illumination optical system 11 can reduce the loss of light as compared with a configuration in which beams are formed by blocking a part of the activating light. It is preferred to set the diameter of the exit end of the optical fiber to be large, because light density of Z-direction Bessel beam illumination light on the optical axis can be increased.

Figure 14A:
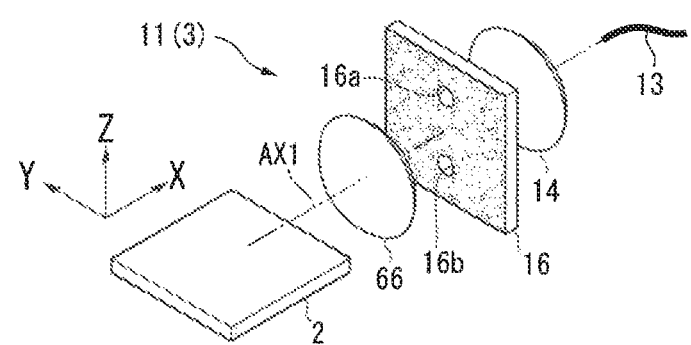
FIGS. 14A and 14B are diagrams illustrating a sixth modification of the activating illumination unit.
Figure 14B:
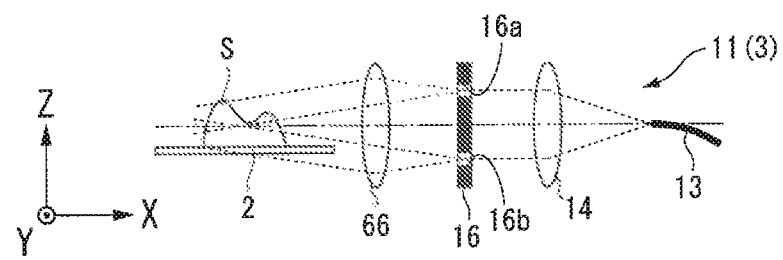

FIG. 14A is a perspective view illustrating a first illumination optical system 11 in a sixth modification. FIG. 14B is a diagram illustrating an optical path in the first illumination optical system 11 in the sixth modification. The first illumination optical system 11 includes, on the light exit side of an optical fiber 13, a collimator lens 14, a slit 16, and a lens 66. For example, an opening portion 16a and an opening portion 16b in the slit 16 are each a through hole with a circular inner edge shape and with an inner diameter that is sufficiently large in terms of the wavelength of the light passing therethrough. The opening portion 16a and the opening portion 16b are away from an optical axis AX1 of the first illumination optical system 11, and are provided symmetrically about the optical axis AX1. Such a first illumination optical system 11 can form sheet light that is a Bessel beam in the Z direction without using the above-mentioned triangular prism 64.

Figure 15A:
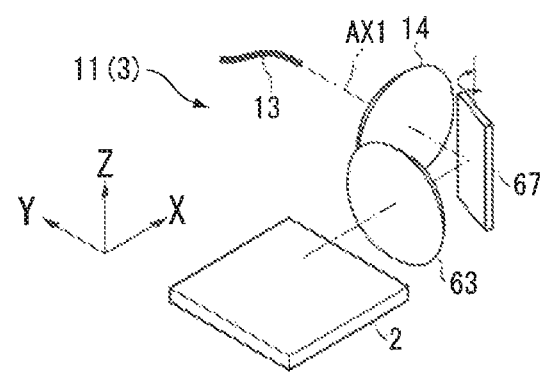
FIGS. 15A and 15B are diagrams illustrating a seventh modification of the activating illumination unit.
Figure 15B:
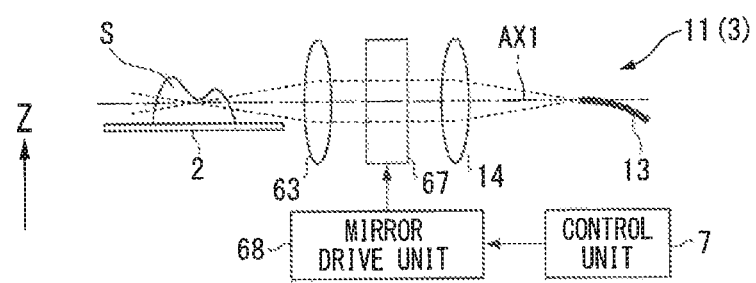

FIG. 15A is a perspective view illustrating a first illumination optical system 11 in a seventh modification. FIG. 15B is a diagram illustrating an optical path in the first illumination optical system 11 in the seventh modification. The first illumination optical system 11 includes, on the light exit side of an optical fiber 13, a collimator lens 14, a mirror 67, and a lens 63. The mirror is disposed in an optical path between the collimator lens 14 and the lens 63. The mirror 67 is provided to be rotatable about an axis parallel to the Z direction. The mirror 67 is driven by the mirror drive unit 68 to rotate. The mirror 67 and the mirror drive unit 68 are, for example, a galvanometer mirror and a MEMS mirror. The control unit 7 can control a rotation position of the mirror 67 by controlling the mirror drive unit 68. Activating light collimated by the collimator lens 14 is reflected by the mirror 67 and deflected to the Y direction in accordance with the rotation position of the mirror 67, and is condensed by the lens 63. In this manner, the activating illumination unit 3 may scan the sample S in the Y direction with activating light (linear activating light) condensed on the YZ plane, thereby irradiating the sample S with the activating light.

Figure 16A:
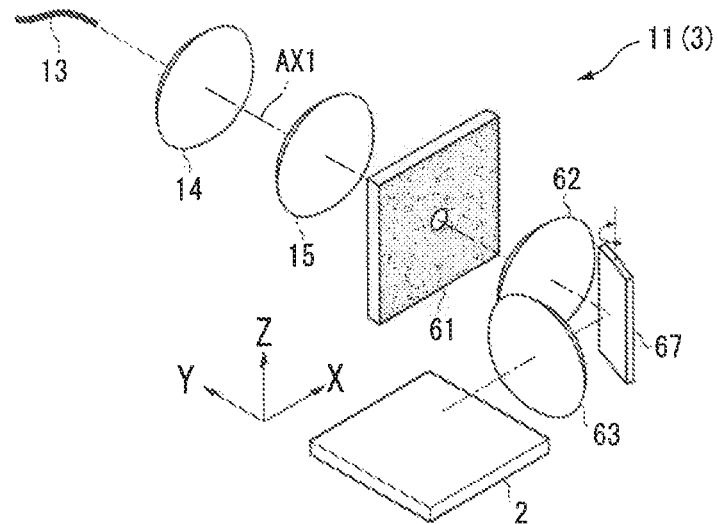
FIGS. 16A and 16B are diagrams illustrating an eighth modification of the activating illumination unit.
Figure 16B:
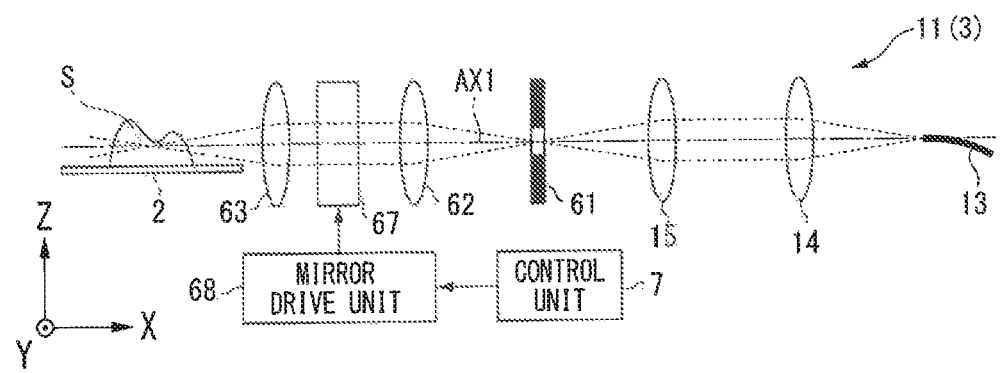

FIG. 16A is a perspective view illustrating a first illumination optical system 11 in an eighth modification. FIG. 16B is a diagram illustrating an optical path in the first illumination optical system 11 in the eighth modification. The first illumination optical system 11 includes, on the light exit side of an optical fiber 13, a collimator lens 14, a condensing lens 15, a pinhole 61, a collimator lens 62, a mirror 67, and a lens 63. The condensing lens 15 condenses activating light collimated by the collimator lens 14 toward an opening portion in the pinhole 61. The collimator lens 62 collimates the activating light from the pinhole 61. The mirror 67 deflects the activating light collimated by the collimator lens 62. The lens 63 condenses the activating light reflected by the mirror 67 in an illumination region. In this manner, the first illumination optical system 11 may scan a sample S with activating light (linear activating light) condensed on the YZ plane by forming beams by the pinhole 61.

Figure 17A:
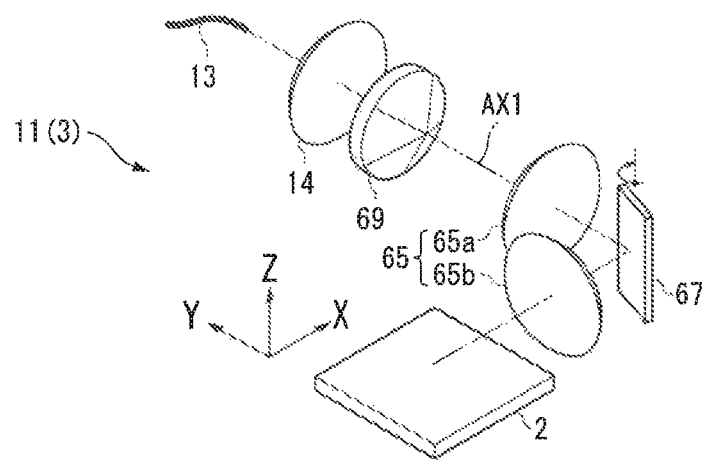
FIGS. 17A and 17B are diagrams illustrating a ninth modification of the activating illumination unit.
Figure 17B:
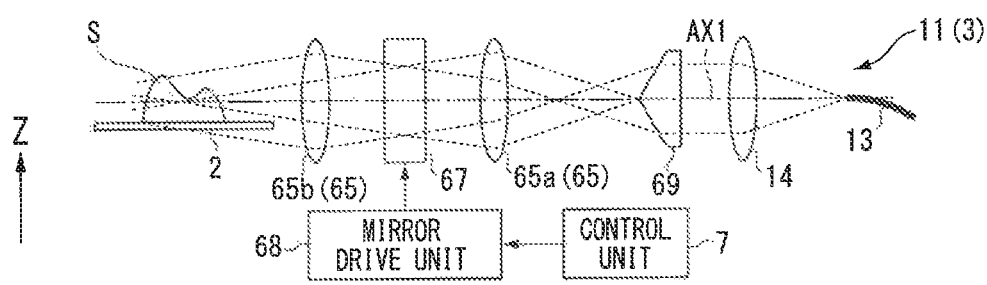

FIG. 17A is a perspective view illustrating a first illumination optical system 11 in a ninth modification. FIG. 17B is a diagram illustrating an optical path in the first illumination optical system 11 in the ninth modification. The first illumination optical system 11 includes, on the light exit side of an optical fiber 13, a collimator lens 14, an axicon lens 69, a lens group 65, and a mirror 67. The axicon lens 69 and the lens group 65 form activating light collimated by the collimator lens 14 into a Bessel beam. The mirror 67 is disposed at a pupil plane of the lens group 65, and deflects the activating light that has passed through the lens group 65 to the Y direction. In this manner, the first illumination optical system 11 may scan a sample S with the activating light formed into a Bessel beam by using the axicon lens 69.

Figure 18A:
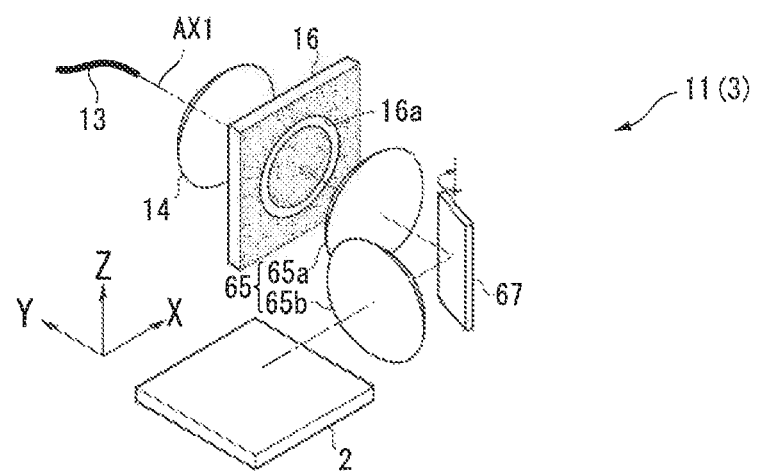
FIGS. 18A and 18B are diagrams illustrating a tenth modification of the activating illumination unit.
Figure 18B:
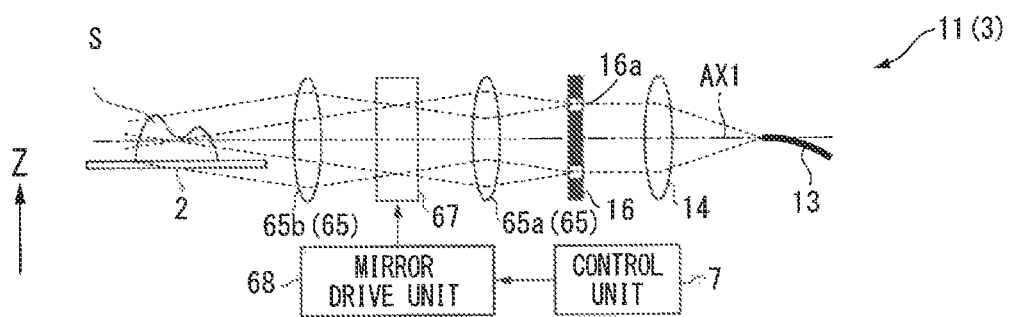

FIG. 18A is a perspective view illustrating a first illumination optical system 11 in a tenth modification. FIG. 18B is a diagram illustrating an optical path in the first illumination optical system 11 in the tenth modification. The first illumination optical system 11 includes, on the light exit side of an optical fiber 13, a collimator lens 14, a slit 16, a lens group 65, and a mirror 67. An opening portion 16a in the slit 16 in the tenth modification has a ring (annular) shape centered at the optical axis AX1 of the first illumination optical system 11. The slit 16 and the lens group 65 form the activating light collimated by the collimator lens 14 into a Bessel beam. The mirror 67 is disposed at a pupil plane of the lens group 65, and deflects the activating light that has passed through the lens group 65. In this manner, the first illumination optical system 11 may scan a sample S with the activating light formed into a Bessel beam by using the slit 16.

Figure 19A:
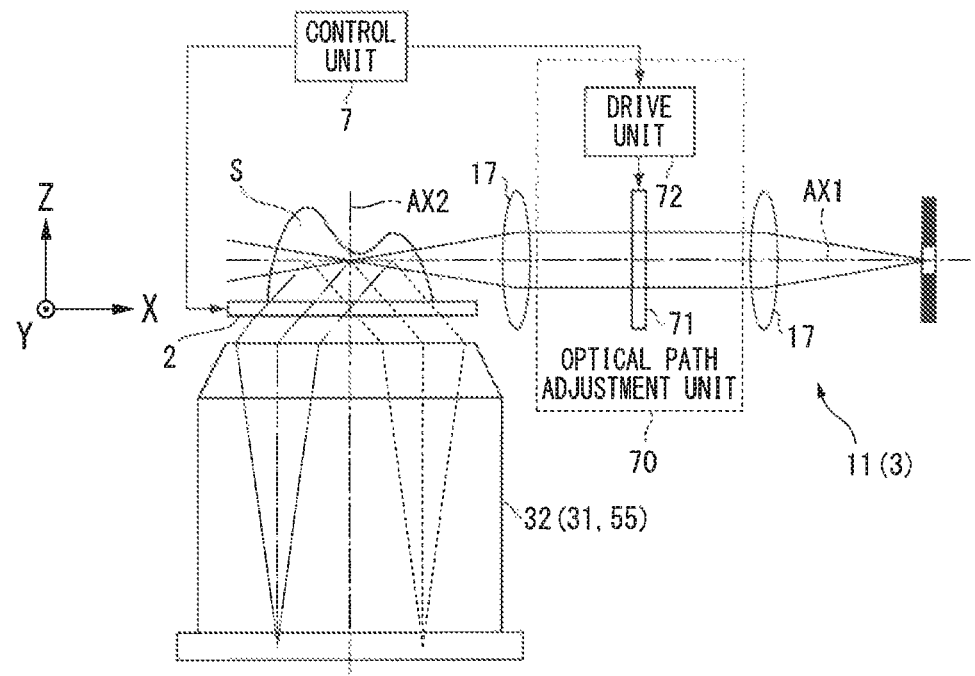
FIGS. 19A and 19B are diagrams illustrating an eleventh modification of the activating illumination unit.
Figure 19B:
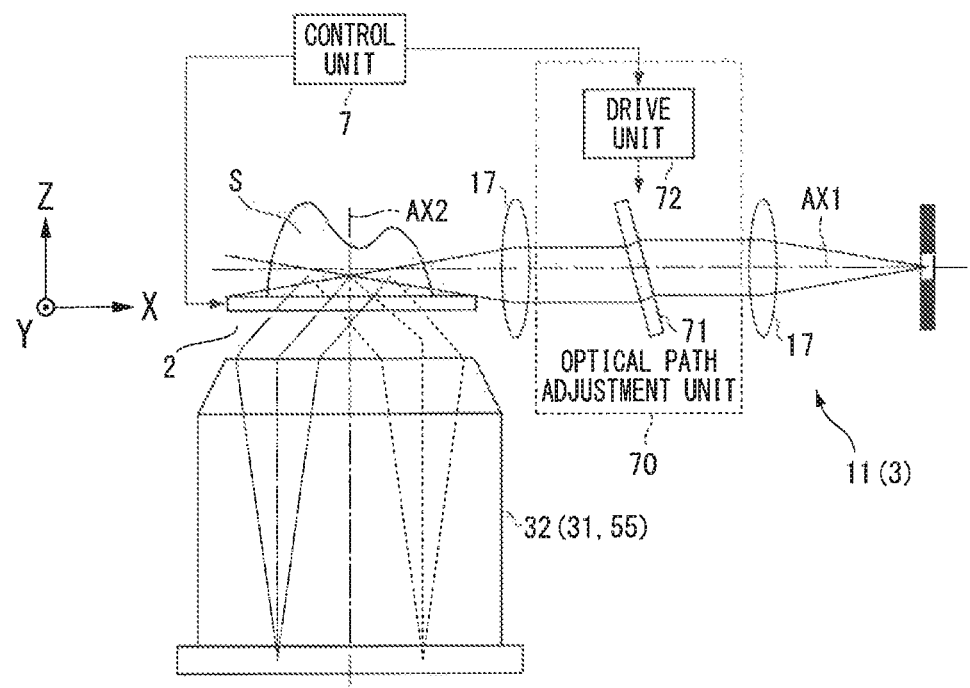

FIGS. 19A and 19B are diagrams illustrating an activating illumination unit 3 in an eleventh modification. The activating illumination unit 3 in the eleventh modification includes an optical path adjustment unit 70 configured to change an optical path of activating light in the Z direction. FIG. 19A illustrates a state before the optical path of the activating light is changed. FIG. 19B illustrates a state after the optical path of the activating light is changed.

The optical path adjustment unit 70 includes, for example, a flat plate 71 through which activating light is transmitted and a drive unit 72 configured to drive the flat plate 71. For example, the flat plate 71 is disposed in an optical path in a first illumination optical system at a position at which the activating light is collimated. In the eleventh modification, the flat plate 71 is disposed in an optical path between lens groups 17.

The drive unit 72 rotationally drives the flat plate 71 about an axis parallel to the Y direction, and changes an angle (inclination angle) of the flat plate 71 with respect to the Z direction. The control unit 7 controls the drive unit 72 to control the angle of the flat plate 71 with respect to the Z direction. As illustrated in FIG. 19B, when the flat plate 71 is inclined, the activating light is refracted at an incident-side interface of the flat plate 71 and at an exit-side interface of the flat plate 71, and the optical path of the activating light shifts in the Z direction. The shift amount of the optical path of the activating light is determined by the refractive index of the flat plate 71, the thickness of the flat plate 71, and the inclination angle of the flat plate 71. The control unit 7 can control the shift amount of the optical path by controlling the inclination angle of the flat plate 71.

The structured illumination microscope 1 can be used as an immersion (oil immersion) microscope in a state in which an immersion liquid (for example, oil) is disposed between the objective lens 32 and the sample S. In this case, in general, the refractive index of the immersion liquid and the refractive index of the sample are different, and hence if the stage 2 is moved in the Z direction while the objective lens 32 is fixed, the optical path length changes. Thus, a region having a high contrast of structured illumination formed by the exciting illumination unit 4 and a plane at which the objective lens 32 is focused are shifted in the Z direction, and the position of the illumination region of the activating illumination unit is misaligned with the position of the illumination region of the exciting illumination unit 4 in the Z direction. In such a case, the control unit 7 controls the drive unit 72 to shift the optical path of activating light in the Z direction, and the illumination region of the activating illumination unit 3 can be aligned with the illumination region of the exciting illumination unit 4. The activating illumination unit 3 and the inactivating illumination unit 20 may be shifted in the Z direction relative to the exciting illumination unit 4 and the imaging unit 5.

Figure 20A:
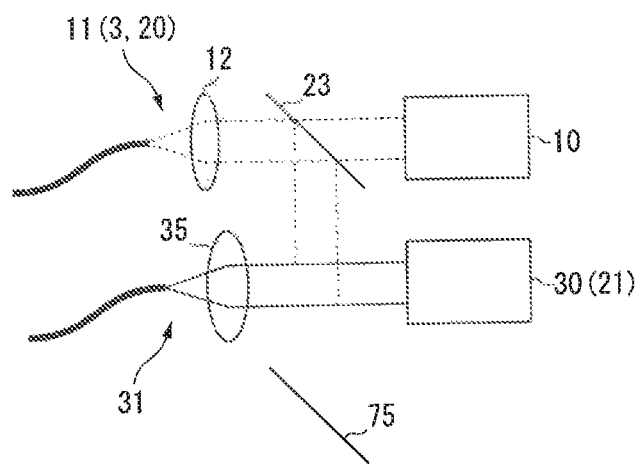
FIGS. 20A and 20B are diagrams illustrating a modification of an inactivating illumination unit.
Figure 20B:
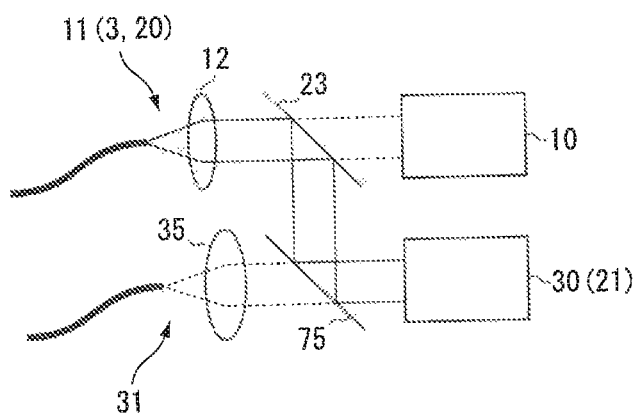

FIGS. 20A and 20B are diagrams illustrating an activating illumination unit 3 in a twelfth modification. In the twelfth modification, a light source unit 30 in an exciting illumination unit 4 serves also as a light source unit 21 in an inactivating illumination unit 20. The inactivating illumination unit 20 includes a mirror 75 that can be inserted and removed to and from an optical path between the light source unit 30 and a condensing lens 35. FIG. 20A illustrates a state in which the mirror 75 is retracted from the optical path between the light source unit 30 and the condensing lens 35 (hereinafter referred to as "retracted state"). FIG. 20B illustrates a state in which the mirror 75 is inserted in the optical path between the light source unit 30 and the condensing lens 35 (hereinafter referred to as "inserted state").

As illustrated in FIG. 20A, exciting light emitted from the light source unit 30 in the retracted state of the mirror 75 enters the condensing lens 35 to be emitted to the sample S through the second illumination optical system (see FIG. 1). As illustrated in FIG. 20B, exciting light emitted from the light source unit 30 in the inserted state of the mirror 75 is reflected by a wavelength selective film of the dichroic mirror 23 to enter the condensing lens 12. The exciting light that has entered the condensing lens 12 irradiates the sample S through the first illumination optical system 11 as inactivating light (see FIG. 1).

The control unit 7 can control a drive unit (not shown) for the mirror 75 to switch the state of the mirror 75 between the retracted state and the inserted state. The light amount of exciting light in taking a modulated image of the sample S is set to, for example, be smaller than the light amount of inactivating light in inactivating the sample S. The control unit 7 can reduce the light emission amount of the light source unit 30 in the retracted state of the mirror 75 as compared with the inserted state of the mirror 75.

Second Embodiment

Figure 21:
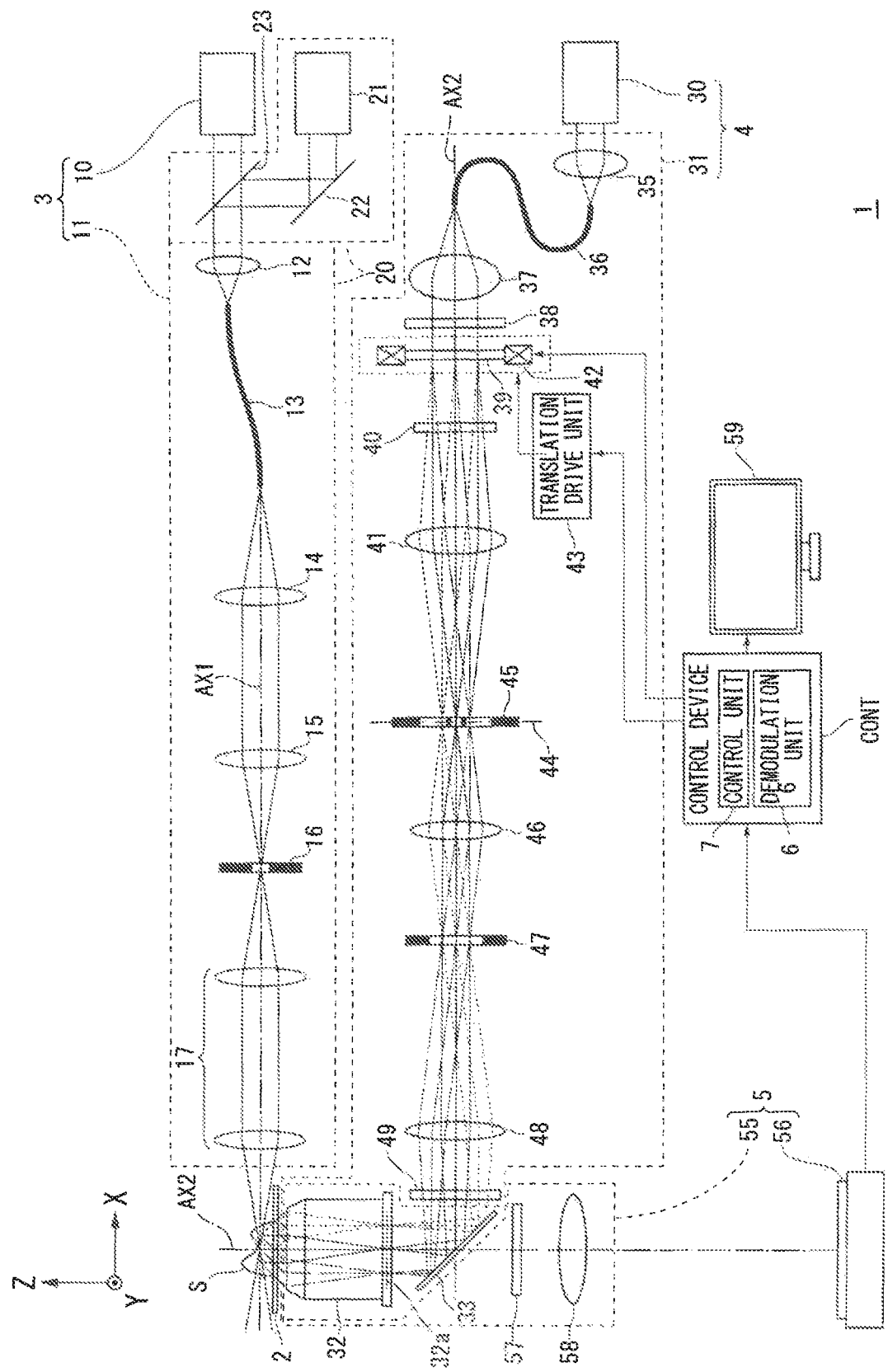
FIG. 21 is a diagram illustrating a structured microscope according to a second embodiment.

Next, a second embodiment is described. In the second embodiment, the same configurations as those in the above-mentioned embodiment are denoted by the same reference numerals, and descriptions thereof are omitted or simplified. FIG. 21 is a diagram illustrating a structured illumination microscope 1 according to the second embodiment. The structured illumination microscope 1 has a 3D-SIM mode for generating a super-resolution image of a sample S in a thickness direction (Z direction).

In the second embodiment, a mask 45 has an opening portion through which the 0th order diffracted light beam generated by a diffraction grating 39 passes. An exciting illumination unit 4 forms combined interference fringes obtained by combining interference fringes generated by two beams of the ±1st orders, interference fringes generated by two beams of the 0th order and the +1st order, and interference fringes generated by two beams of the 0th order and the −1st order in an illumination region. In the illumination region, light intensity of the combined interference fringes periodically changes within a plane parallel to the XY plane and periodically changes within a plane parallel to the YZ plane as well.

In the second embodiment, modulated components to be superimposed on a modulated image have five kinds of a −2nd order modulated component, a −1st order modulated component, a 0th order modulated component, a +1st order modulated component, and a +2nd order modulated component. For example, the control unit 7 controls the rotation drive unit 42 to change the orientation of interference fringes in a plurality of ways (for example, three kinds), and controls the translation drive unit 43 to change the phase of the interference fringes in a plurality of ways (for example, five kinds) with respect to each orientation of the interference fringes, and then a modulated image with each phase is taken by the imaging unit 5. The demodulation unit 6 uses a plurality of (fifteen in the above-mentioned example) modulated images to separate five kinds of modulated components, thereby generating a super-resolution image. For the demodulation calculation, the method described in "Super-Resolution Video Microscopy of Live Cells by Structured Illumination", Peter Kner, Bryant B. Chhun, Eric R. Griffis, Lukman Winoto, and Mats G. L. Gustafsson, NATURE METHODS Vol. 6 No. 5, pp. 339-342, (2009) can be used, but the demodulation calculation is not limited to this method.

The structured illumination microscope 1 in the second embodiment may be configured that the opening portion in the mask 45 through which the 0th order diffracted light beam passes can be opened and closed to execute the 2D-SIM mode described in the first embodiment. For example, the structured illumination microscope 1 can switch between the 2D-SIM mode and the 3D-SIM mode in response to an instruction from a user. For example, the 2D-SIM mode is selected when the thickness of the illumination region of the activating illumination unit 3 is equal to or smaller than a threshold (for example, equal to or smaller than 1 μm). For example, the 3D-SIM mode is selected when the thickness of the illumination region of the activating illumination unit 3 exceeds the threshold.

The technical scope of the present invention is not limited to the embodiments and modifications described above. For example, one or more requirements described in the embodiments and modifications may be omitted. The requirements described in the embodiments and modifications may be combined as appropriate. As far as laws and regulations permit, the entire contents of documents cited in the above-mentioned embodiments and modifications are incorporated herein by reference.

DESCRIPTION OF REFERENCE SIGNS

1 . . . structured illumination microscope, 2 . . . stage, 3 . . . activating illumination unit, 4 . . . exciting illumination unit, 5 . . . imaging unit, 6 . . . demodulation unit, 7 . . . control unit, S . . . sample, 10 . . . light source unit, 11 . . . first illumination optical system, 20 . . . inactivating illumination unit, 21 . . . light source unit, 30 . . . light source unit, 31 . . . second illumination optical system, 55 . . . imaging optical system

What is claimed is:

1. A structured illumination microscope, comprising:
a first illumination optical system configured to irradiate, from a first direction, a sample with activating light for activating a fluorescent substance included in the sample;
a second illumination optical system, comprising an objective lens configured to irradiate, from a second direction that is different from the first direction, the sample with interference fringes of exciting light through the objective lens for exciting the fluorescent substance;
a control unit configured to control a direction and a phase of the interference fringes;
an imaging optical system, comprising the objective lens configured to form an image of the sample irradiated with the interference fringes;
an imaging element configured to take the image formed by the imaging optical system; and
a demodulation unit configured to generate an image by using a plurality of the first images taken by the imaging element, wherein
the second illumination optical system includes:
a branch unit configured to branch the exciting light into a plurality of diffracted light beams by diffraction, the plurality of diffracted light beams including at least one pair of
+−1st order diffracted light beam; and
a light blocking unit capable of blocking either the +1st order diffracted light beam or the −1st order diffracted light beam in the at least one pair while transmitting the other of the +1st order diffracted light beam or the −1st order diffracted light beam in the at least one pair.

2. The structured illumination microscope according to claim 1, wherein the first illumination optical system is configured to irradiate the sample with the activating light having a sheet shape.

3. The structured illumination microscope according to claim 1, wherein the first illumination optical system includes a cylindrical lens.

4. The structured illumination microscope according to claim 1, wherein the first illumination optical system is configured to scan the activating light in a third direction that is different from the first direction and the second direction.

5. The structured illumination microscope according to claim 1, further comprising a third illumination optical system configured to irradiate the sample with inactivating light for inactivating the fluorescent substance.

6. The structured illumination microscope according to claim 5, wherein the exciting light has a wavelength that is same as a wavelength of the inactivating light.

7. The structured illumination microscope according to claim 5, wherein the control unit is configured to:
irradiate the sample with the activating light from the first direction to activate the fluorescent substance;
irradiate the activated fluorescent substance with the exciting light from the second direction; and
irradiate the sample with the inactivating light after irradiation of the exciting light.

8. The structured illumination microscope according to claim 5, wherein the third illumination optical system is configured to irradiate the sample with the inactivating light from the first direction.

9. The structured illumination microscope according to claim 5, wherein the third illumination optical system is configured to irradiate the sample with the inactivating light from the second direction.

10. The structured illumination microscope according to claim 5, wherein the first illumination optical system and the third illumination optical system at least partially share an optical path.

11. The structured illumination microscope according to claim 5, wherein the second illumination optical system and the third illumination optical system at least partially share an optical path.

12. The structured illumination microscope according to claim 5, wherein the inactivating light has intensity larger than intensity of the exciting light.

13. The structured illumination microscope according to claim 5, wherein
the first illumination optical system includes a stop member disposed at a position optically conjugate with the sample, and
an opening width of the stop member when the inactivating light passes through the first illumination optical system is set to be larger than that when the activating light passes through the first illumination optical system.

14. The structured illumination microscope according to claim 5, wherein the control unit is configured to stop the irradiation of the inactivating light when a detection value of the imaging element is equal to or less than a threshold.

15. The structured illumination microscope according to claim 5, wherein the control unit is configured to stop the irradiation of the inactivating light when a temporal change amount of a detection value of the imaging element is equal to or less than a threshold.

16. The structured illumination microscope according to claim 1, wherein the control unit is configured to irradiate the sample with the activating light until an activation state of the fluorescent substance becomes a saturated state.

17. The structured illumination microscope according to claim 16, wherein the control unit is configured to stop the irradiation of the activating light when a detection value of the imaging element is equal to or more than a threshold.

18. The structured illumination microscope according to claim 16, wherein the control unit is configured to stop the irradiation of the activating light from the first illumination optical system when a temporal change amount of a detection value of the imaging element is equal to or less than a threshold.

19. The structured illumination microscope according to claim 1, wherein
the control unit is configured to set the light blocking unit to the blocked state, and control the imaging element to detect light from the sample while irradiating the sample with the activating light from the first illumination optical system.

20. An observation method, comprising:
irradiating, using a first illumination optical system and from a first direction, a sample with activating light for activating a fluorescent substance included in the sample;
irradiating, using a second illumination optical system having an objective lens, and from a second direction that is different from the first direction, the sample with interference fringes of exciting light for exciting the fluorescent substance;
controlling a direction and a phase of the interference fringes;
forming, using an imaging optical system having the objective lens, an image of the sample irradiated with the interference fringes;
taking, using an imaging element, the image formed by the imaging optical system;
generating an image by using a plurality of the images taken by the imaging element, and;
branching the exciting light into a plurality of diffracted light beams by diffraction, the plurality of diffracted light beams including at least one pair of +−1st order diffracted light beam; and
blocking either the +1st order diffracted light beam or the −1st order diffracted light beam in the at least one pair while transmitting the other of the +1st order diffracted light beam or the −1st order diffracted light beam in the at least one pair.

21. A non-transitory tangible media storing therein a control program for causing a computer to implement:
irradiating, using a first illumination optical system and from a first direction, a sample with activating light for activating a fluorescent substance included in the sample;
irradiating, using a second illumination optical system having an objective lens, and from a second direction that is different from the first direction, the sample with interference fringes of exciting light for exciting the fluorescent substance;
controlling a direction and a phase of the interference fringes;
forming, using an imaging optical system having the objective lens, an image of the sample irradiated with the interference fringes;
taking, using an imaging element, the image formed by the imaging optical system;
generating an image by using a plurality of the images taken by the imaging element, and;
branching the exciting light into a plurality of diffracted light beams by diffraction, the plurality of diffracted light beams including at least one pair of +−1st order diffracted light beam; and
blocking either the +1st order diffracted light beam or the −1st order diffracted light beam in the at least one pair while transmitting the other of the +1st order diffracted light beam or the −1st order diffracted light beam in the at least one pair.

* * * * *